(12) United States Patent
Richter et al.

(10) Patent No.: US 11,797,148 B1
(45) Date of Patent: Oct. 24, 2023

(54) SELECTIVE EVENT DISPLAY

(71) Applicant: Apple Inc., Cupertino, CA (US)

(72) Inventors: Ian M. Richter, Los Angeles, CA (US); Michael John Cafarella, Newton Highlands, MA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/729,505

(22) Filed: Apr. 26, 2022

Related U.S. Application Data

(60) Provisional application No. 63/197,870, filed on Jun. 7, 2021.

(51) Int. Cl.
| | |
|---|---|
| G06F 3/048 | (2013.01) |
| G06F 3/04815 | (2022.01) |
| G06T 19/00 | (2011.01) |
| G06T 15/00 | (2011.01) |

(52) U.S. Cl.
CPC ........ G06F 3/04815 (2013.01); G06T 15/005 (2013.01); G06T 19/006 (2013.01)

(58) Field of Classification Search
CPC .. G06F 3/04815; G06T 15/005; G06T 19/006
See application file for complete search history.

(56) References Cited

U.S. PATENT DOCUMENTS

| | | | |
|---|---|---|---|
| 8,091,026 B2 | 1/2012 | Wolff et al. | |
| 8,522,155 B2 | 8/2013 | Mindrum | |
| 8,533,266 B2 | 9/2013 | Koulomzin et al. | |
| 8,538,376 B2 | 9/2013 | Lee et al. | |
| 8,676,937 B2 | 3/2014 | Rapaport et al. | |
| 8,732,161 B2 | 5/2014 | Jain et al. | |
| 9,183,247 B2 | 11/2015 | Priyadarshan et al. | |
| 9,558,191 B2 | 1/2017 | Mccurdy et al. | |
| 10,303,342 B2 | 5/2019 | Bennett | |
| 10,409,858 B2 | 9/2019 | Duggal et al. | |
| 10,489,103 B1 * | 11/2019 | Gruebele | G06F 1/3275 |
| 10,546,010 B2 | 1/2020 | Imbruce et al. | |
| 10,614,467 B2 | 4/2020 | Dipersia et al. | |
| 2007/0061424 A1 | 3/2007 | Mattaway | |
| 2012/0323890 A1 | 12/2012 | Dixon et al. | |
| 2013/0018882 A1 | 1/2013 | Listermann | |
| 2013/0080922 A1 * | 3/2013 | Elias | G06Q 10/1095 715/753 |

(Continued)

*Primary Examiner* — Haoshian Shih
(74) *Attorney, Agent, or Firm* — Fernando & Partners LLP

(57) ABSTRACT

In one implementation, a method of displaying event representations based on a user input is performed at a device including an input device, a display, a processor, and non-transitory memory. The method includes obtaining event data regarding a plurality of events associated with a first user. The method includes obtaining a first plurality of event representations respectively associated with a first subset of the plurality of events. The method includes displaying, on the display, the first plurality of event representations and a path representation traversing the first plurality of event representations. The method includes detecting, via the input device, a user input. The method includes, in response to detecting the user input, obtaining a second plurality of event representations respectively associated with a second subset of the plurality of events and displaying, on the display, the second plurality of event representations.

20 Claims, 20 Drawing Sheets

(56) References Cited

U.S. PATENT DOCUMENTS

| | | | |
|---|---|---|---|
| 2013/0339446 A1* | 12/2013 | Balassanian | H04L 65/403 |
| | | | 709/204 |
| 2014/0089816 A1* | 3/2014 | DiPersia | G06Q 50/01 |
| | | | 715/753 |
| 2014/0214843 A1 | 7/2014 | Arvig | |
| 2015/0317057 A1* | 11/2015 | Choi | G01C 21/3673 |
| | | | 715/757 |

* cited by examiner

600

At a device including an input device, a display, one or more processors, and non-transitory memory:

Obtaining event data regarding a plurality of events associated with a user, wherein each of the plurality of events is respectively associated with one or more of a plurality of event types ⸺610

Detecting, via the input device, a user input selecting a particular event type of the plurality of event types ⸺620

Obtaining a plurality of event representations respectively associated with a subset of the plurality of events associated with the particular event type ⸺630

Displaying, on the display, the plurality of event representations and a path representation traversing the plurality of event representations ⸺640

At a device including an input device, a display, one or more processors, and non-transitory memory:

Obtaining event data regarding a plurality of events associated with a user — 710

Obtaining a plurality of event representations respectively associated with a subset of the plurality of events — 720

Displaying, on the display, the plurality of event representations and a path representation traversing the plurality of event representations — 730

Detecting, via the input device, a user input selecting a particular one of the plurality of event representations associated with a particular one of the plurality of events — 740

Obtaining one or more supplemental event representations respectively associated with one or more of the plurality of events associated with the particular one of the plurality of events — 750

Displaying, on the display, the one or more supplemental event representations — 760

At a device including an input device, a display, one or more processors, and non-transitory memory:

Obtaining event data regarding a plurality of events associated with a first user ⟶ 810

Obtaining a plurality of event representations respectively associated with a subset of the plurality of events ⟶ 820

Displaying, on the display, the plurality of event representations and a path representation traversing the plurality of event representations ⟶ 830

Detecting, via the input device, a user input selecting a second user ⟶ 840

Obtaining one or more supplemental event representations respectively associated with one or more of the plurality of events associated with the second user ⟶ 850

Displaying, on the display, the one or more supplemental event representations ⟶ 860

At a device including an input device, a display, one or more processors, and non-transitory memory:

Obtaining event data regarding a plurality of events associated with a first user — 910

Obtaining a first plurality of event representations respectively associated with a first subset of the plurality of events — 920

Displaying, on the display, the first plurality of event representations and a path representation traversing the plurality of event representations — 930

Detecting, via the input device, a user input — 940

Obtaining a second plurality of event representations respectively associated with a second subset of the plurality of events — 950

Displaying, on the display, the second plurality of event representations — 960

Figure 9

SELECTIVE EVENT DISPLAY

CROSS-REFERENCE TO RELATED APPLICATIONS

This application claims priority to U.S. Provisional Patent App. No. 63/197,870, filed on Jun. 7, 2021, which is hereby incorporated by reference in its entirety.

TECHNICAL FIELD

The present disclosure generally relates to systems, methods, and devices for selectively displaying representations of events.

BACKGROUND

An event map includes, for a plurality of events, a respective plurality of event representations displayed at a respective plurality of locations on the event map. However, in various implementations, if an amount of the plurality of events is great, it may be difficult, cumbersome, or aesthetically displeasing to simultaneously display, on the event map, respective event representations for all of the plurality of events.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart representation of a method of displaying event representations associated with a selected event type in accordance with some implementations.

FIG. 7 is a flowchart representation of a method of displaying event representations associated with a related event in accordance with some implementations.

FIG. 8 is a flowchart representation of a method of displaying event representations associated with multiple users in accordance with some implementations.

FIG. 9 is a flowchart representation of a method of displaying event representations based on a user input in accordance with some implementations.

Figure 1:
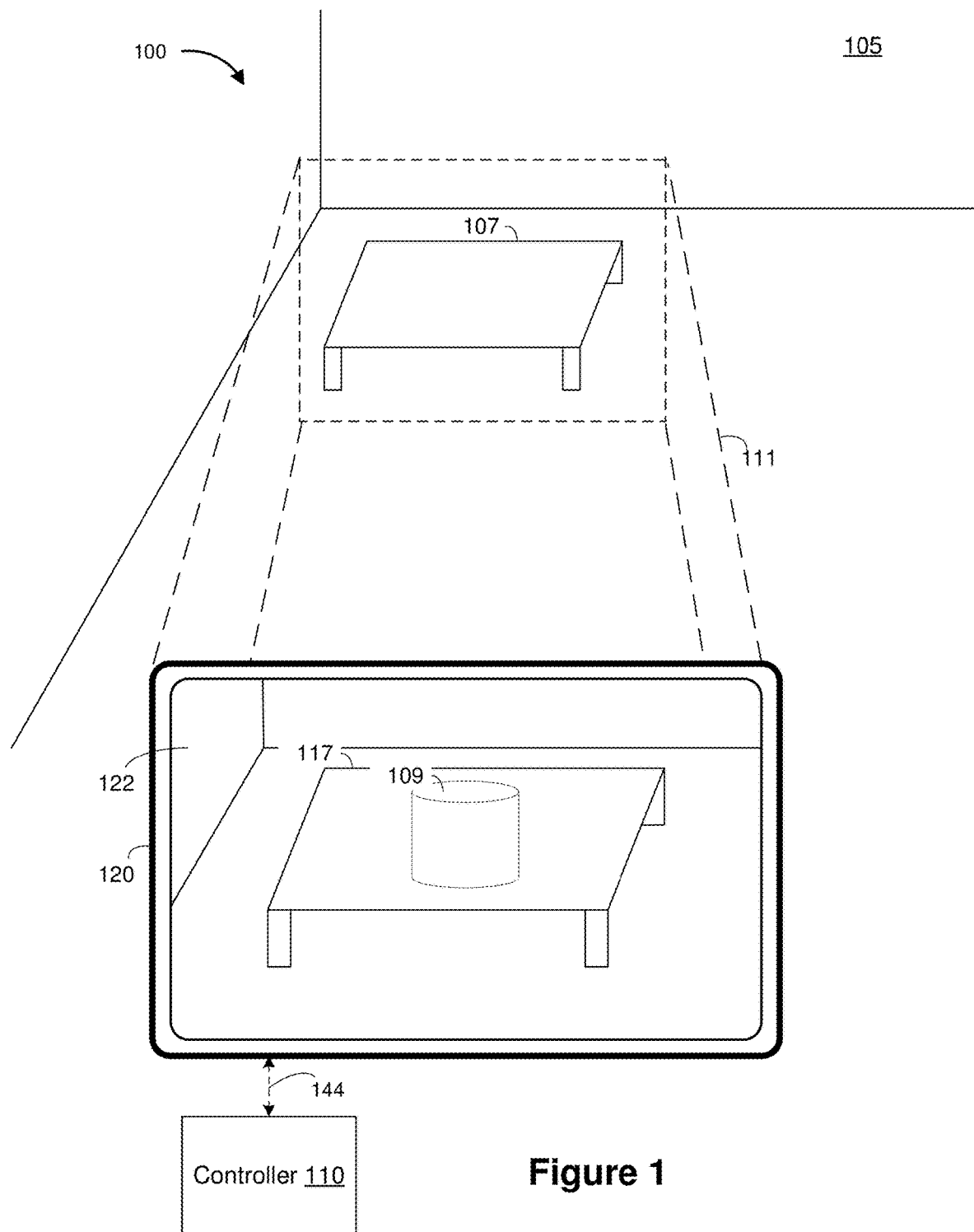
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying event representations associated with a selected event type. In various implementations, the method is performed by a device including an input device, a display, a processor, and non-transitory memory. The method includes obtaining event data regarding a plurality of events associated with a user, wherein each of the plurality of events is respectively associated with one or more of a plurality of event types. The method includes detecting, via the input device, a user input selecting a particular event type of the plurality of event types. The method includes obtaining a plurality of event representations respectively associated with a subset of the plurality of events associated with the particular event type. The method includes displaying, on the display, the plurality of event representations and a path representation traversing the plurality of event representations.

Various implementations disclosed herein include devices, systems, and methods for displaying event representations associated with a related event. In various implementations, the method is performed by a device including an input device, a display, a processor, and non-transitory memory. The method includes obtaining event data regarding a plurality of events associated with a user. The method includes obtaining a plurality of event representations respectively associated with a subset of the plurality of events. The method includes displaying, on the display, the plurality of event representations and a path representation traversing the plurality of event representations. The method includes detecting, via the input device, a user input selecting a particular one of the plurality of event representations associated with a particular one of the plurality of events. The method includes, in response to detecting the user input, obtaining one or more supplemental event representations respectively associated with one or more of the plurality of events associated with the particular one of the plurality of events and displaying, on the display, the one or more supplemental event representations.

Various implementations disclosed herein include devices, systems, and methods for displaying event representations associated with multiple users. In various implementations, the method is performed by a device including an input device, a display, a processor, and non-transitory memory. The method includes obtaining event data regarding a plurality of events associated with a first user. The method includes obtaining a plurality of event representations respectively associated with a subset of the plurality of events. The method includes displaying, on the display, the plurality of event representations and a path representation traversing the plurality of event representations. The method includes detecting, via the input device, a user input selecting a second user. The method includes, in response to detecting the user input, obtaining one or more supplemental event representations respectively associated with one or more of the plurality of events associated with the second user and displaying, on the display, the one or more supplemental event representations.

Various implementations disclosed herein include devices, systems, and methods for displaying event representations based on a user input. In various implementations, the method is performed by a device including an input device, a display, a processor, and non-transitory memory. The method includes obtaining event data regarding a plurality of events associated with a first user. The method includes obtaining a first plurality of event representations respectively associated with a first subset of the plurality of events. The method includes displaying, on the display, the first plurality of event representations and a path representation traversing the first plurality of event representations. The method includes detecting, via the input device, a user input. The method includes, in response to detecting the user input, obtaining a second plurality of event representations respectively associated with a second subset of the plurality of events and displaying, on the display, the second plurality of event representations.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, in various implementations, an event map includes, for a plurality of events, a respective plurality of event representations displayed at a respective plurality of locations on the event map. In various implementations, the events are associated with a first user. For example, the first user may manually document events or grant access to a social media account with recorded events. As another example, the first user may grant access to a photo set and an electronic device generates event data based on the photo set. However, in various implementations, if the first user is associated with a large number of events, it may be difficult, cumbersome, or aesthetically displeasing to simultaneously display, on the event map, respective event representations for all of the plurality of events.

Accordingly, in various implementations, the electronic device displays event representations for a subset of the plurality of events. In response to a user input, the electronic device displays event representations for a different subset of the plurality of events.

For example, in various implementations, each of the plurality of events is associated with an event type. Initially, the electronic device displays event representations for events having a first event type. In response to a user input selecting a second event type, the electronic device displays event representations for events having the second event type (instead of or in addition to the event representations for events having the first event type).

As another example, in various implementations, the electronic device displays event representations for a subset of the plurality of events. In response to a user input selecting a particular event representation for a particular event, the electronic device displays event representations for events related to the particular event. For example, the electronic device displays event representations for events that are the cause of or are caused by the particular event.

As another example, in various implementations, the electronic device displays event representations for a subset of the plurality of events of the first user. In response to a user input selecting a second user, the electronic device displays additional event representations for events of the first user which are related to the second user. In various implementations, the electronic device also displays event representations for a plurality of events of the second user.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
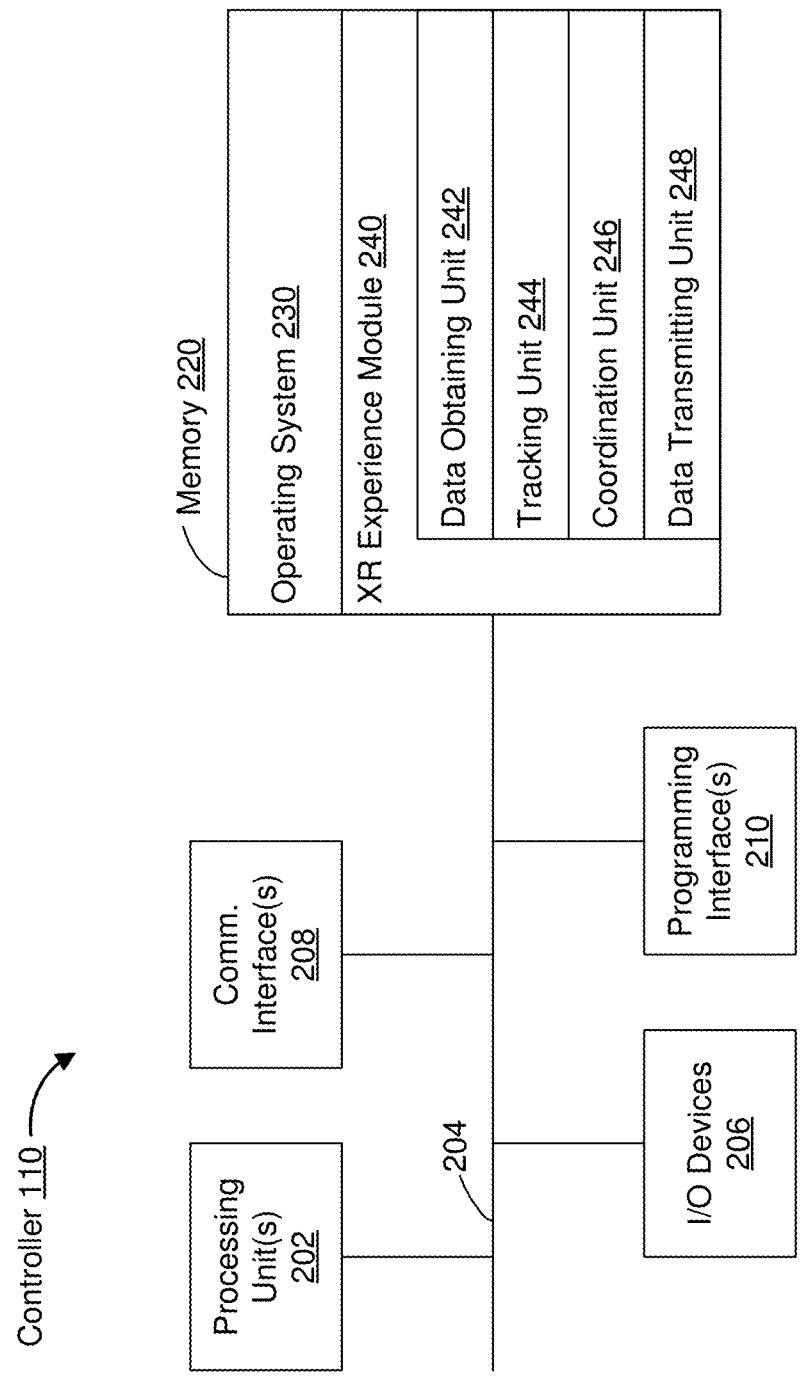
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
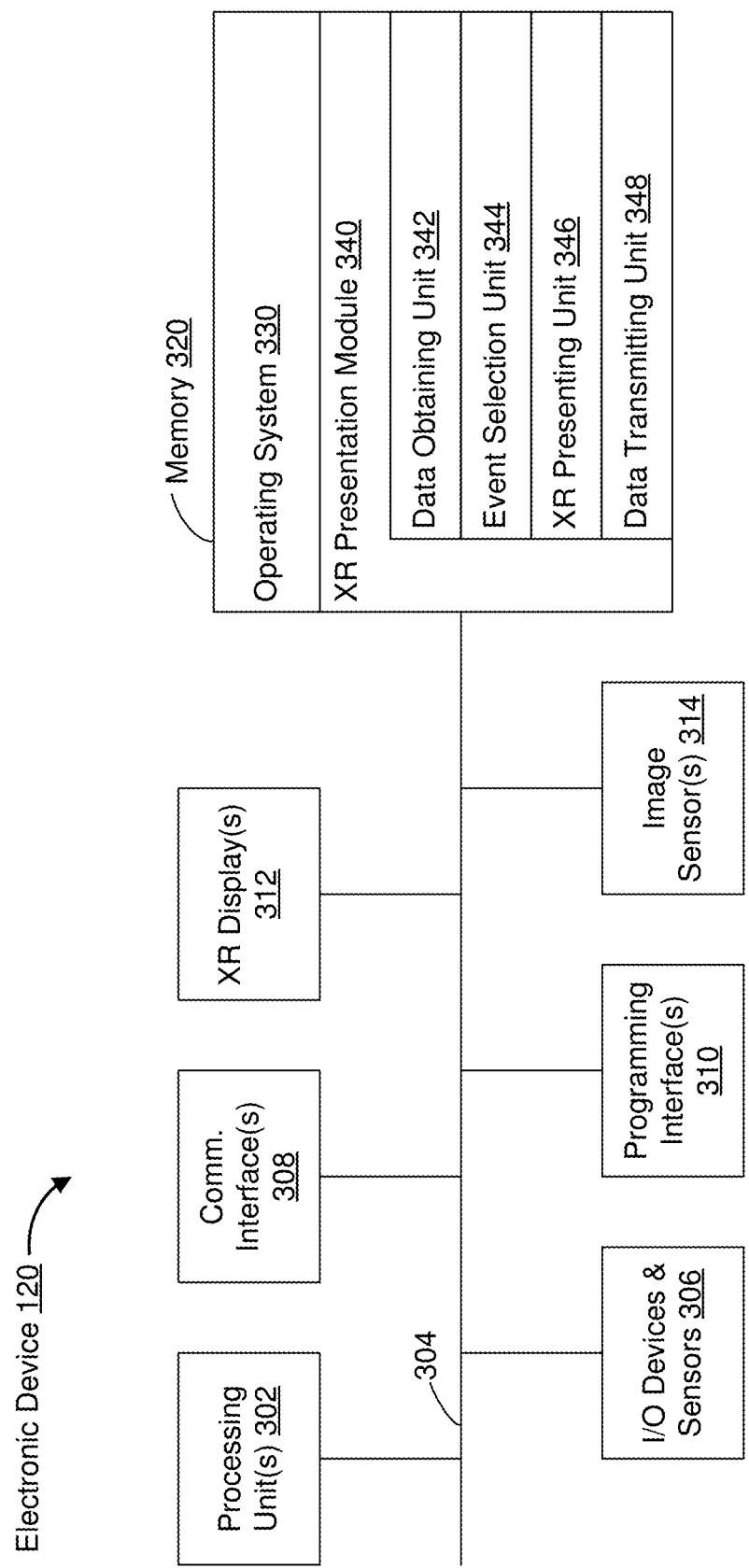
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (and may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, an event selection unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1, such as event data regarding a plurality of events. To that end, in various implementations, the data obtaining unit 342 includes instructions and/or logic therefor, and heuristics and metadata therefor.

In some implementations, the event selection unit 344 is configured to select a subset of the plurality of events based on a user input. To that end, in various implementations, the event selection unit 344 includes instructions and/or logic therefor, and heuristics and metadata therefor.

In some implementations, the XR presenting unit 346 is configured to present XR content via the one or more XR displays 312, such as an event map including event representations of the subset of the plurality of events. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the event selection unit 344, the XR presenting unit 346, and the data transmitting unit 348 are shown as residing on a single device (e.g., the electronic device 120), it should be understood that in other implementations, any combination of the data obtaining unit 342 the event selection unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
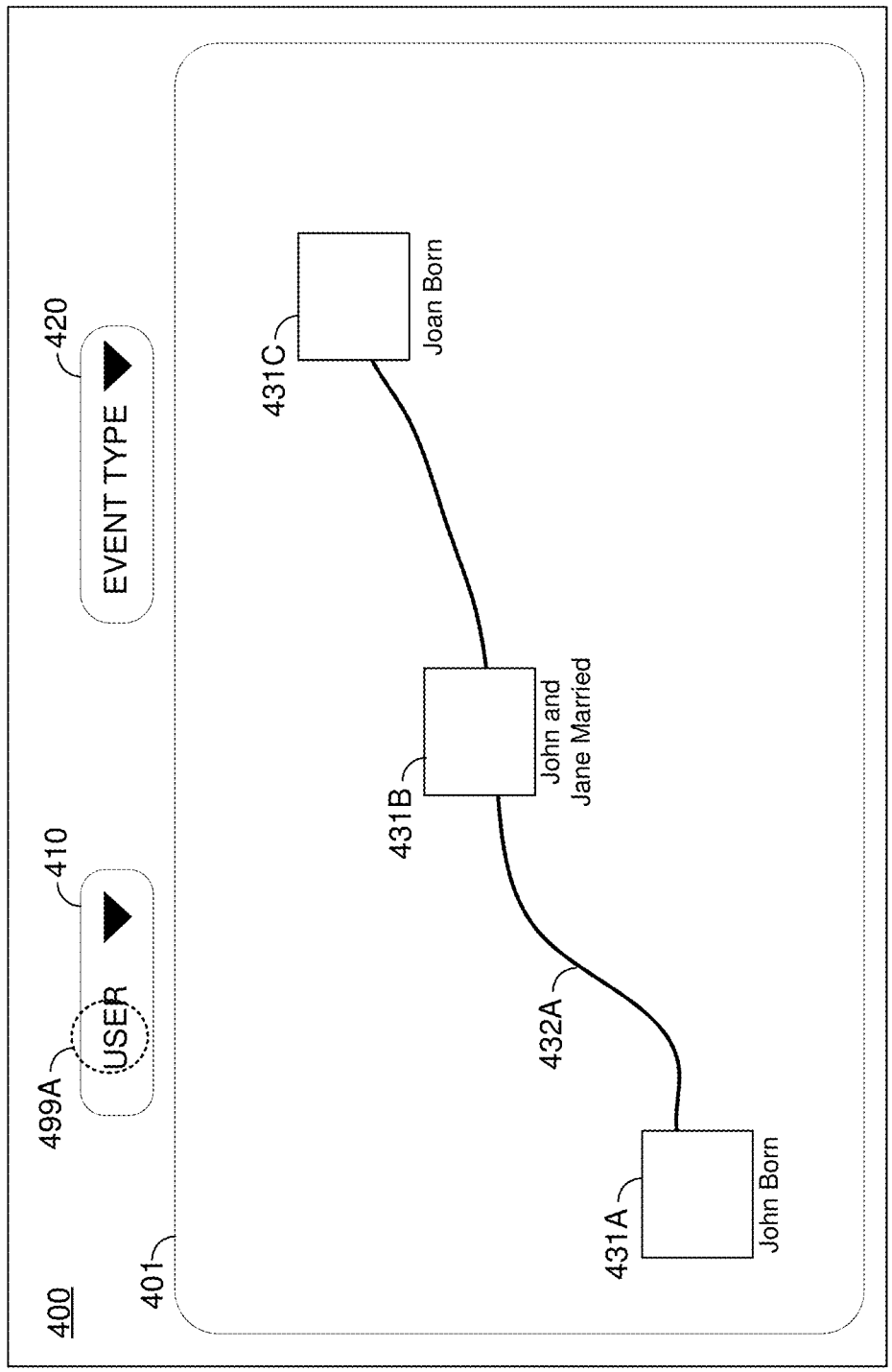
FIGS. 4A-4J illustrate an event map user interface in accordance with some implementations.

FIG. 4A illustrates an event map user interface 400. The event map user interface 400 includes an event map 401, a user selection menu 410, and an event type selection menu 420. The event map 401 includes a plurality of event representations 431A-431C displayed at respective locations of the event map. In various implementations, the event map 401 includes a background image. In various implementations, the background image is a map of a geographical area, such as a country or the world.

Each event representation 431A-431C is associated with a corresponding event. In various implementations, the event is represented as an event data object. In various implementations, the event data object includes an event identifier, such as a unique number or alphanumeric string. In various implementations, the event data object includes data indicative of a title of the event, such as "John Born". In various implementations, the event data object includes data indicative of a time and/or date of the event. In various implementations, the event data object includes data indicative of a location of the event. In various implementations, the event data object includes content associated with the event, such as images of the event. In various implementations, the content includes text, images, audio, video, or XR content.

In various implementations, the event data object includes data indicative of one or more users (or people) associated with the event. In various implementations, the event data object includes data indicative of an event type of the event. In various implementations, the event data object includes data indicative of one or more related events. For example, in various implementations, the data indicative of one or more related events includes one or more references to other data objects via their event identifier. In various implementations, the event data object includes data indicative of a significance of the event. In various implementations, the data indicative of the significance of the event is a numerical significance score.

The event map 401 includes a first path representation 432A traversing the event representations 431A-431C. In various implementations, the first path representation 432A traverses the event representations 431A-431C in temporal order defined by the time and/or date of the events as indicated in the corresponding event data objects.

The event map user interface 400 includes a user selection menu 410 which, when selected, expands, e.g., in a dropdown manner, to display a number of users that can be selected or deselected. When a user is selected, the event map user interface 400 includes event representations of events associated with that user. Similarly, the event map user interface 400 includes an event type selection menu 420 which, when selected, expands, e.g., in a dropdown manner, to display a number of event types that can be selected or deselected. When an event type is selected, the event map user interface 400 includes event representations of events associated with that event type.

FIG. 4A illustrates a user input 499A directed to the user selection menu 410. In various implementations, the user input 499A is input by a user tapping a finger (or stylus) on a touch-sensitive display at the location of the user selection menu 410. In various implementations, the user input 499A is input by a user clicking a mouse button while a cursor is displayed at the location of the user selection menu 410. In various implementations, the user input 499A is input by a user gazing at the user selection menu 410 and performing a hand gesture, a facial gesture, or vocal command In various implementations, the user input 499A is input by a vocal command, e.g., "Open User Selection Menu".

Figure 4B:
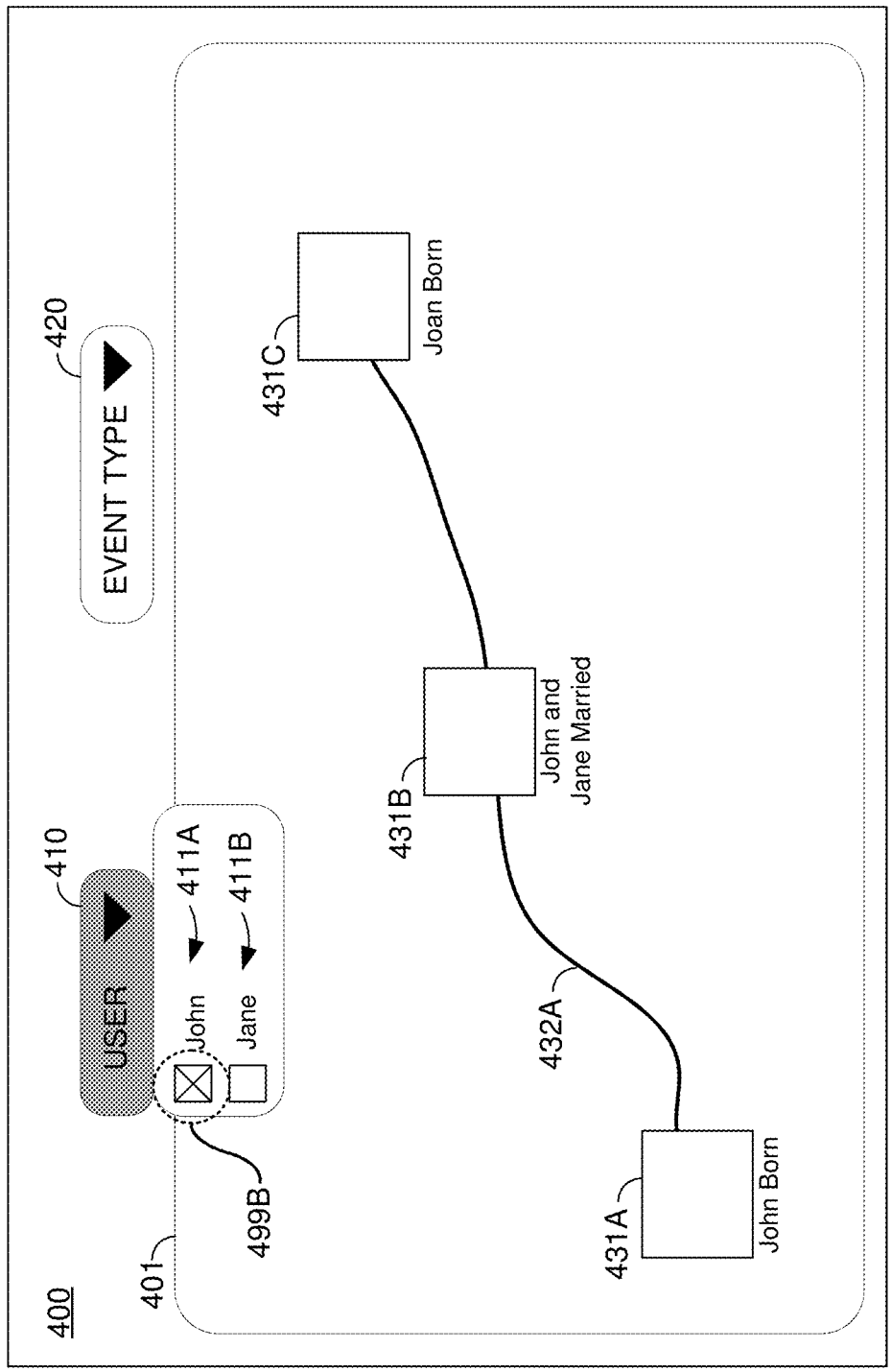

FIG. 4B illustrates the event map user interface 400 in response to detecting the user input 499A directed to the user selection menu 410. In FIG. 4B, the user selection menu 410 is expanded to display two user selection affordances 411A-411B respectively associated with two users. In particular, the user selection menu 410 includes a first user selection affordance 411A associated with a first user named "John" and a second user selection affordance 411B associated with a second user named "Jane". In FIG. 4B, the first user selection affordance 411A is activated (and the first user is selected), as indicated by the X in the first user selection affordance 411A, and the second user selection affordance 411B is not activated (and the second user is not selected). Accordingly, the event map 401 includes event representations 431A-431C associated with events associated with the first user named "John".

For example, in FIG. 4B, the event map 401 includes a first event representation 431A associated with an event relating to the first user's birth and associated with the first user, a second event representation 431B associated with an event relating to the first user's marriage to the second user and associated with the first user and the second user, and a third event representation 431C associated with an event relating to the birth of a third user, the first user's and second user's child (named "Joan"), and associated with the first user, the second user, and the third user.

FIG. 4B illustrates a user input 499B directed to the first user selection affordance 411A. In various implementations, the user input 499B is input by a user tapping a finger (or stylus) on a touch-sensitive display at the location of the first user selection affordance 411A. In various implementations, the user input 499B is input by a user clicking a mouse button while a cursor is displayed at the location of the first user selection affordance 411A. In various implementations, the user input 499B is input by a user gazing at the first user selection affordance 411A and performing a hand gesture, a facial gesture, or vocal command In various implementations, the user input 499B is input by a vocal command, e.g., "Deselect John".

Figure 4C:
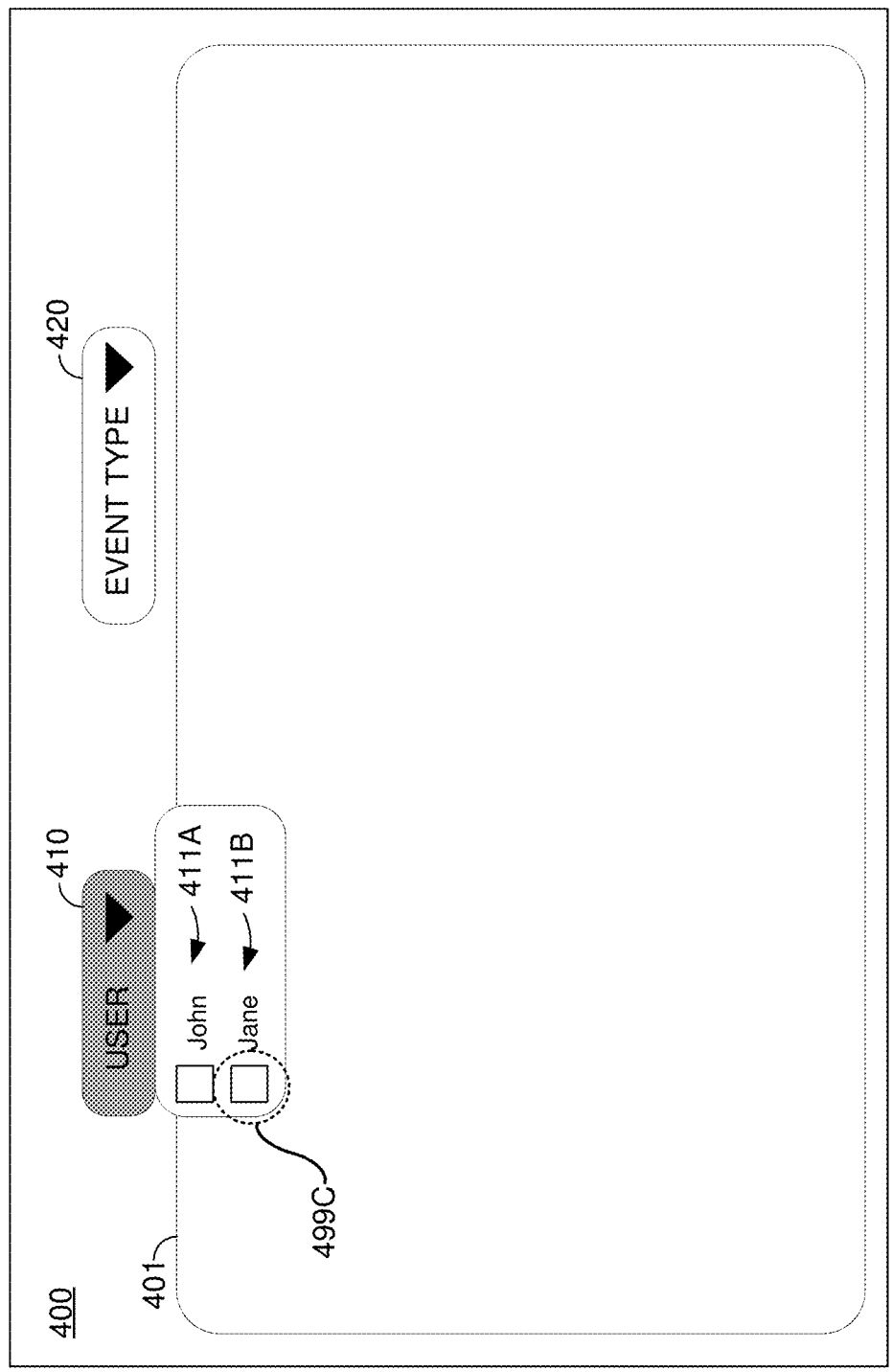

FIG. 4C illustrates the event map user interface 400 in response to detecting the user input 499B directed to the first user selection affordance 411A. In FIG. 4C, the first user selection affordance 411A is inactivated. Accordingly, with no users selected, the event map 401 displays no event representations.

FIG. 4C illustrates a user input 499C directed to the second user selection affordance 411B. In various implementations, the user input 499C is input by a user tapping a finger (or stylus) on a touch-sensitive display at the location of the second user selection affordance 411B. In various implementations, the user input 499C is input by a user clicking a mouse button while a cursor is displayed at the location of the second user selection affordance 411B. In various implementations, the user input 499C is input by a user gazing at the second user selection affordance 411B and performing a hand gesture, a facial gesture, or vocal command In various implementations, the user input 499C is input by a vocal command, e.g., "Select Jane".

Figure 4D:
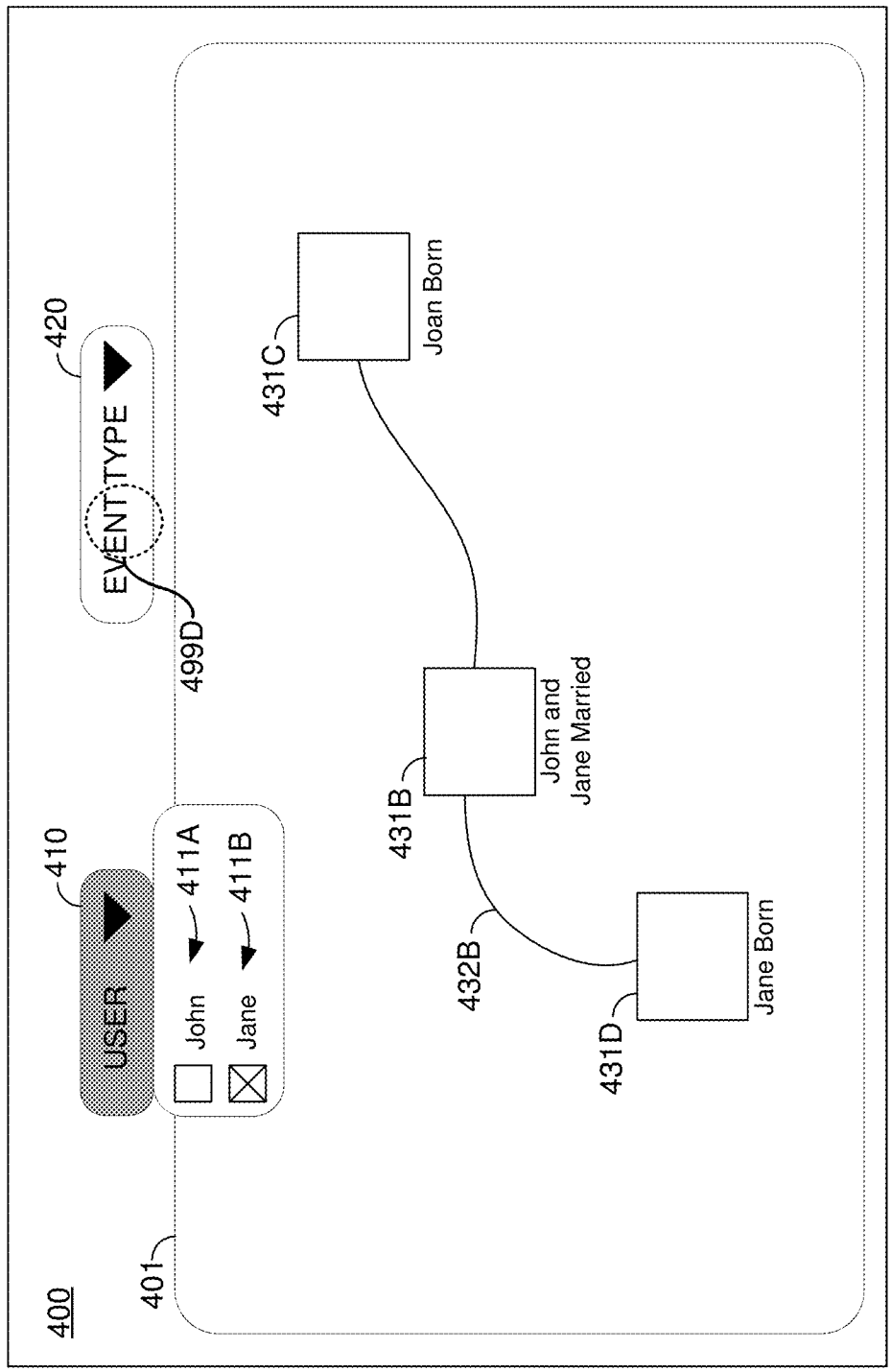

FIG. 4D illustrates the event map user interface 400 in response to detecting the user input 499C directed to the second user selection affordance 411B. In FIG. 4D, the second user selection affordance 411B is activated. Accordingly, the event map 401 displays event representations 431B-431D associated with events associated with the second user. For example, in FIG. 4D, the event map 401 no longer includes the first event representation 431A associated with an event relating to the first user's birth and associated with the first user because that event is not associated with the second user. However, the event map 401 includes the second event representation 431B associated with an event relating to the first user's marriage to the second user and associated with the first user and the second user and also includes the third event representation 431C associated with an event relating to the birth of a third user, the first user's and second user's child (named "Joan"), and associated with the first user, the second user, and the third user. Further, the event map 401 includes a fourth event representation 431D associated with an event relating to the second user's birth and associated with the second user.

Further, the event map 401 no longer includes the first path representation 432A traversing event representations associated with events associated with the first user, but instead includes a second path representation 432B traversing the event representations 431B-431D associated with events associated with the second user.

FIG. 4D illustrates a user input 499D directed to the event type selection menu 420. In various implementations, the user input 499D is input by a user tapping a finger (or stylus) on a touch-sensitive display at the location of the event type selection menu 420. In various implementations, the user input 499D is input by a user clicking a mouse button while a cursor is displayed at the location of the event type selection menu 420. In various implementations, the user input 499D is input by a user gazing at the event type selection menu 420 and performing a hand gesture, a facial gesture, or vocal command In various implementations, the user input 499D is input by a vocal command, e.g., "Open Event Type Selection Menu".

Figure 4E:
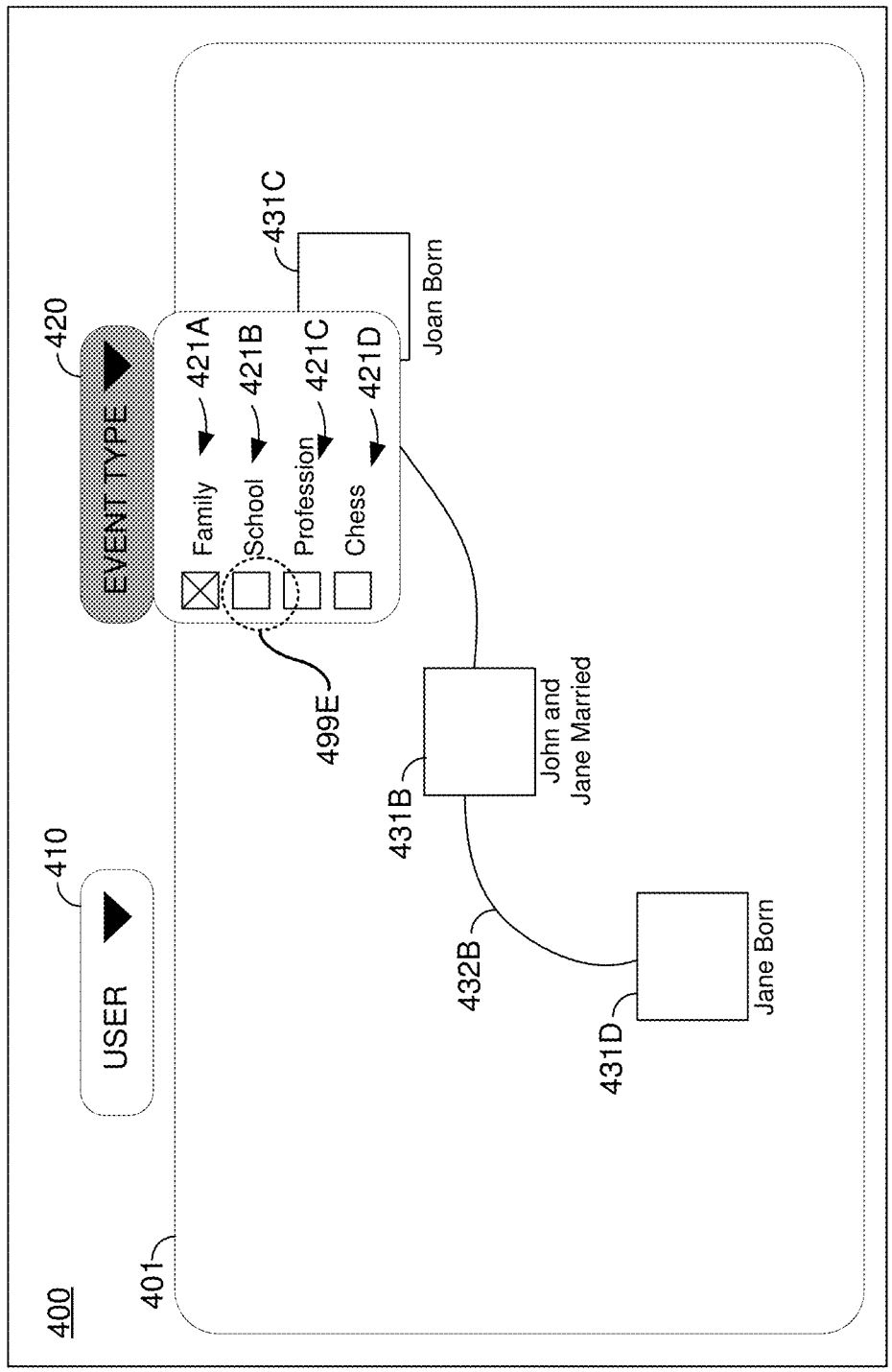

FIG. 4E illustrates the event map user interface 400 in response to detecting the user input 499D directed to the event type selection menu 420. In FIG. 4E, the event type selection menu 420 is expanded to display four event type selection affordances 421A-421D respectively associated with four event types. Further, the user selection menu 410 is collapsed.

The expanded event type selection menu 420 includes a first event type selection affordance 421A associated with a first event type named "Family", a second event type selection affordance 421B associated with a second event type named "School", a third event type selection affordance 421C associated with a third event type named "Profession", and a fourth event type selection affordance 421D associated with a fourth event type named "Chess".

In FIG. 4E, the first event type selection affordance 421A is activated, as indicated by the X in the first event type selection affordance 421A and the other event type selection affordances 421B-421D are not activated. Accordingly, the event map 401 includes event representations 431B-431D associated with events associated with the first event type (and the second user).

FIG. 4E illustrates a user input 499E directed to the second event type selection affordance 421B. In various implementations, the user input 499E is input by a user tapping a finger (or stylus) on a touch-sensitive display at the location of the second event type selection affordance 421B. In various implementations, the user input 499E is input by a user clicking a mouse button while a cursor is displayed at the location of the second event type selection affordance 421B. In various implementations, the user input 499E is input by a user gazing at the second event type selection affordance 421B and performing a hand gesture, a facial gesture, or vocal command In various implementations, the user input 499E is input by a vocal command, e.g., "Select School".

Figure 4F:
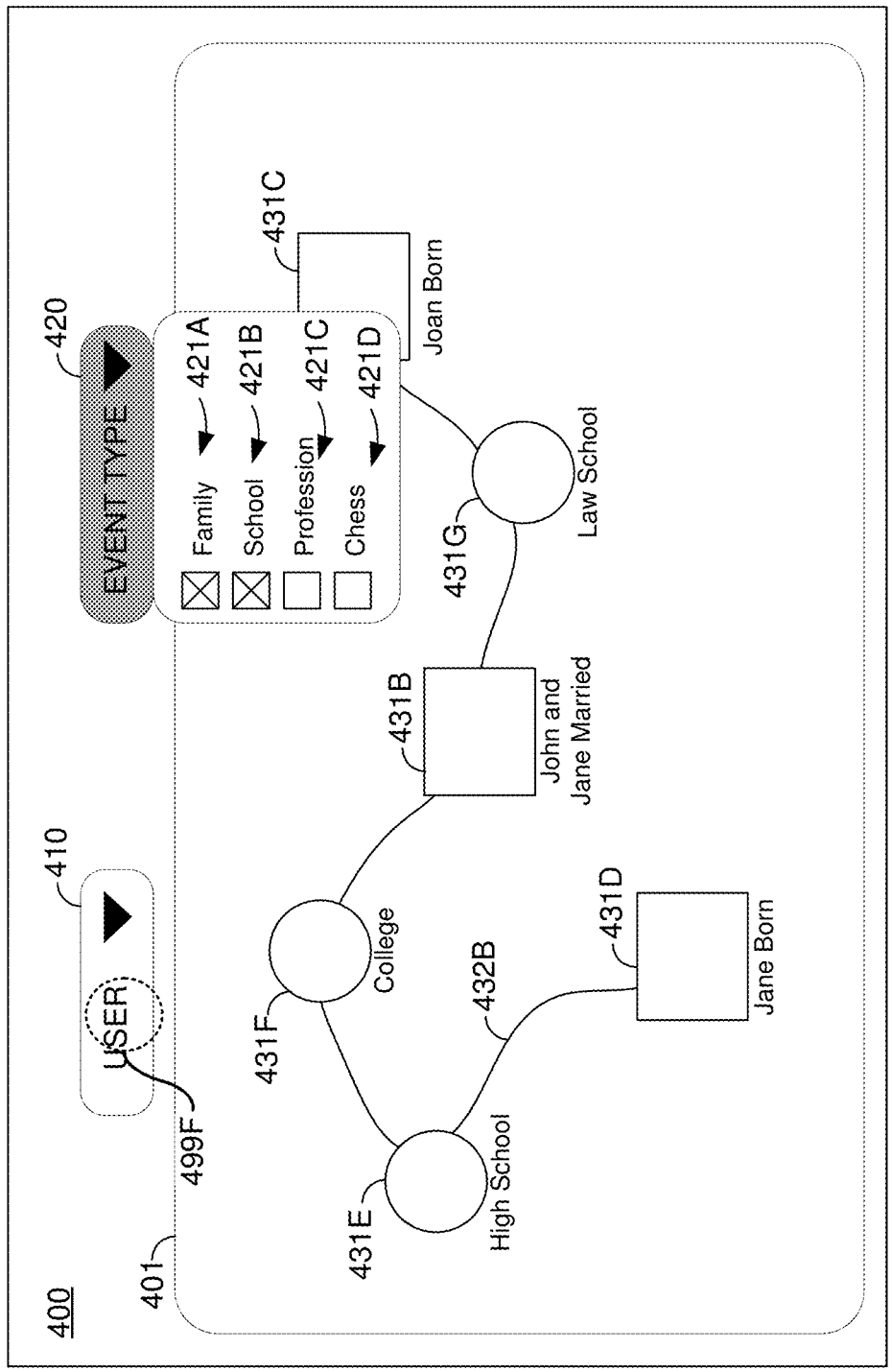

FIG. 4F illustrates the event map user interface 401 in response to detecting the user input 499E directed to the second event type selection affordance 421B. In FIG. 4F, the second event type selection affordance 421B is activated. Accordingly, the event map 401 displays event representations 431E-431G associated with events associated with the second event type (and the second user) in addition to the event representations 431B-431D associated with events associated with the first event type (and the second user). For example, in FIG. 4F, the event map 401 includes a fifth event representation 431E associated with an event relating to the second user's high school experience, a sixth event representation 431F associated with an event relating to the second user's college experience, and a seventh event representation 431G associated with an event relating to the second user's law school experience. Further, the second path representation 432B is changed to traverse all of the event representations 431B-431G associated with events associated with the second user in temporal order.

FIG. 4F illustrates a user input 499F directed to the user selection menu 410. In various implementations, the user input 499F is input by a user tapping a finger (or stylus) on a touch-sensitive display at the location of the user selection menu 410. In various implementations, the user input 499F is input by a user clicking a mouse button while a cursor is displayed at the location of the user selection menu 410. In various implementations, the user input 499F is input by a user gazing at the user selection menu 410 and performing a hand gesture, a facial gesture, or vocal command In various implementations, the user input 499F is input by a vocal command, e.g., "Open User Selection Menu".

Figure 4G:
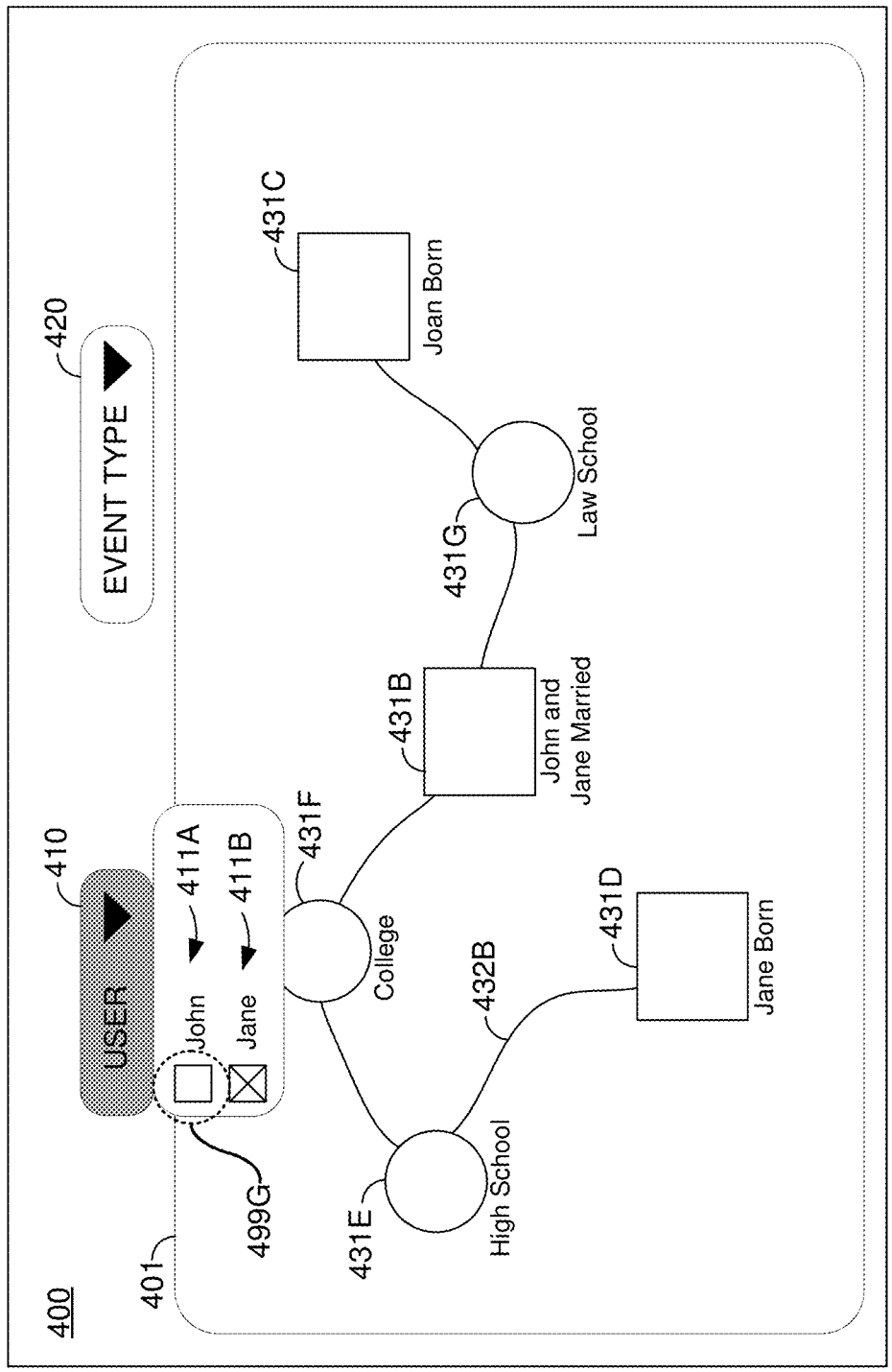

FIG. 4G illustrates the event map user interface 400 in response to detecting the user input 499F directed to the user selection menu 410. In FIG. 4G, the user selection menu 410 is expanded to display the user selection affordances 411A-411B and the event selection menu 420 is collapsed.

FIG. 4G illustrates a user input 499G directed to the first user selection affordance 411A. In various implementations, the user input 499G is input by a user tapping a finger (or stylus) on a touch-sensitive display at the location of the first user selection affordance 411A. In various implementations, the user input 499G is input by a user clicking a mouse button while a cursor is displayed at the location of the first user selection affordance 411A. In various implementations, the user input 499G is input by a user gazing at the first user selection affordance 411A and performing a hand gesture, a facial gesture, or vocal command In various implementations, the user input 499G is input by a vocal command, e.g., "Select John".

Figure 4H:
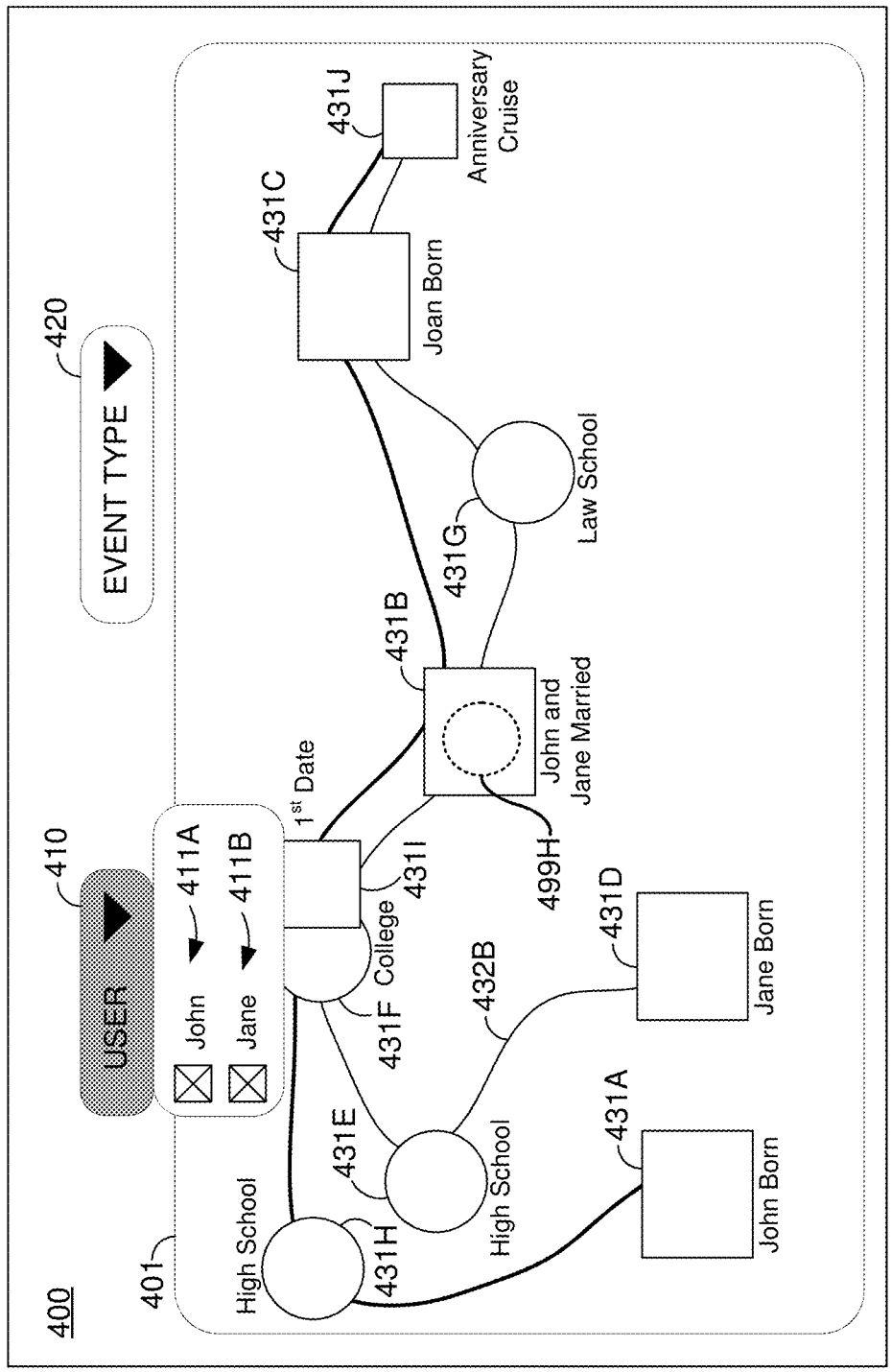

FIG. 4H illustrates the event map user interface 400 in response to detecting the user input 499G directed to the first user selection affordance 411A. In FIG. 4H, the first user selection affordance 411A is activated. Accordingly, the event map 401 displays event representations 431A-431C, 431H-J associated with events associated with the first user (and either the first event type or the second event type) in addition to the event representations 431B-431G, 431I-431J associated with events associated with the second user (and either the first event type or the second event type).

For example, in FIG. 4H, the event map 401 includes the first event representation 431A associated with an event relating to the first user's birth because the event is associated with the first user and the first event type. The event map 401 includes the second event representation 431B associated with an event relating to the first user's marriage to the second user because the event is associated with the first user (and the second user) and the first event type. The event map 401 includes the third event representation 431C associated with an event relating to the birth of the third user because the event is associated with the first user (and the second user) and the first event type. The event map 401 includes the fourth event representation 431D associated with an event relating to the second user's birth because the event is associated with the second user and the first event type.

The event map 401 includes the fifth event representation 431E associated with an event relating to the second user's high school experience because the event is associated with the second user and the second event type. The event map 401 includes the sixth event representation 431F associated with an event relating to the second user's college experience because the event is associated with the second user and the second event type. The event map 401 includes the seventh event representation 431G associated with an event relating to the second user's law school experience because the event is associated with the second user and the second event type. The event map 401 includes an eighth event representation 431H associated with an event relating to the first user's high school experience because the event is associated with the first user and the second event type.

In various implementations, the event map 401 includes event representations which are only displayed when two or more users are selected. For example, in FIG. 4H, the event map 401 includes a ninth event representation 431I associated with an event relating to the first user's first date with the second user because the event is associated with the first user and the second user and the first event type. Further, in FIG. 4H, the event map 401 includes a tenth event representation 431J associated with an event relating to an anniversary cruise of the first user and the second user because the event is associated with the first user and the second user and the first event type.

Thus, the ninth event representation 431I is associated with both the first user and the second user. The ninth event representation 431I is not displayed in FIG. 4A when only the first user is selected and is also not displayed in FIG. 4D when only the second user is selected. However, when both the first user and the second user are selected, as in FIG. 4H, the ninth event representation 431I is displayed. Similarly, the tenth event representation 431J is associated with the first user and the second user. The tenth event representation 431J is not displayed in FIG. 4A when only the first user is selected and is also not displayed in FIG. 4D when only the second user is selected. However, when both the first user and the second user are selected, as in FIG. 4H, the tenth event representation 431J is displayed.

FIG. 4H illustrates a user input 499H directed to the second event representation 431B. In various implementations, the user input 499H is input by a user tapping a finger (or stylus) on a touch-sensitive display at the location of the second event representation 431B. In various implementations, the user input 499H is input by hovering a finger (or stylus) over the touch-sensitive display at the location of the second event representation 431B. In various implementations, the user input 499H is input by a user clicking a mouse button while a cursor is displayed at the location of the second event representation 431B. In various implementations, the user input 499H is input by a user hovering a cursor over the second event representation 431B for at least a threshold amount of time. In various implementations, the user input 499H is input by a user gazing at the second event representation 431B and performing a hand gesture, a facial gesture, or vocal command In various implementations, the user input 499H is input by a user gazing at the second event representation 431B for at least a threshold amount of time. In various implementations, the user input 499H is input by a vocal command, e.g., "Select John and Jane Married".

Figure 4I:
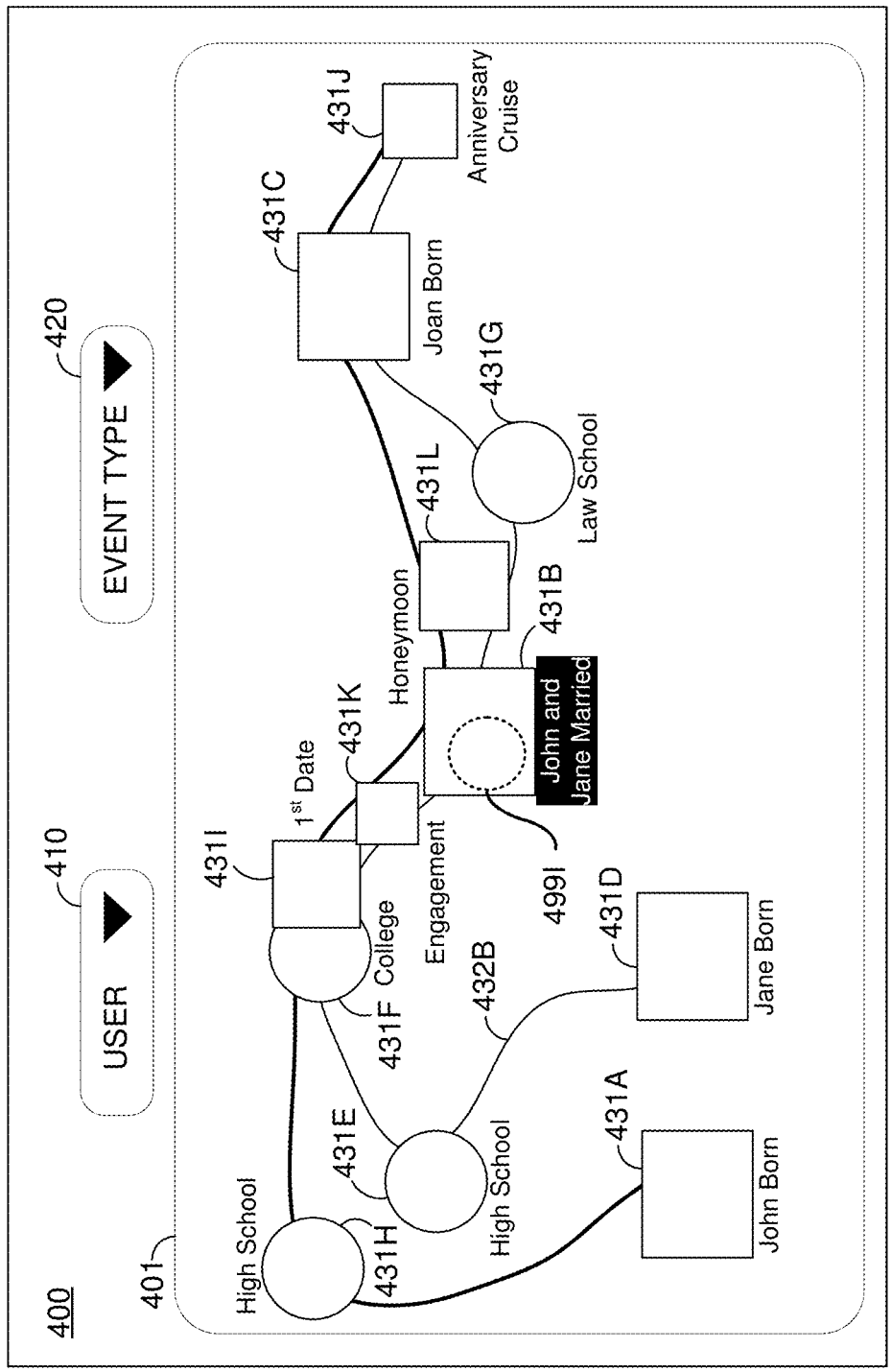

FIG. 4I illustrates the event map user interface 400 in response to detecting the user input 499H directed to the second event representation 431B. In FIG. 4I, the user selection menu 410 is collapsed and the second event representation 431B is selected. When the second event representation 431B is selected, the event map 401 includes event representations 431K-431L associated with events related to the selected event. For example, in FIG. 4I, the event map 401 includes an eleventh event representation 431K associated with an event relating to the first user's engagement with the second user because the event is a cause of the event relating to the first user's marriage with the second user. Further, the event map 401 includes a twelfth event representation 431K associated with an event relating to honeymoon of the first user and the second user because the event is an effect (or was caused by) the event relating to the first user's marriage with the second user.

FIG. 4I illustrates a user input 499I directed to the second event representation 431B. In various implementations, the user input 499I is input by a user tapping a finger (or stylus) on a touch-sensitive display at the location of the second event representation 431B while the second event representation 431B is selected. In various implementations, the user input 499H is input by a user clicking a mouse button while a cursor is displayed at the location of the second event representation 431B while the second event representation 431B is selected. In various implementations, the user input 499I is input by a user gazing at the second event representation 431B and performing a hand gesture, a facial gesture, or vocal command In various implementations, the user input 499I is input by a vocal command, e.g., "Expand John and Jane Married".

Figure 4J:
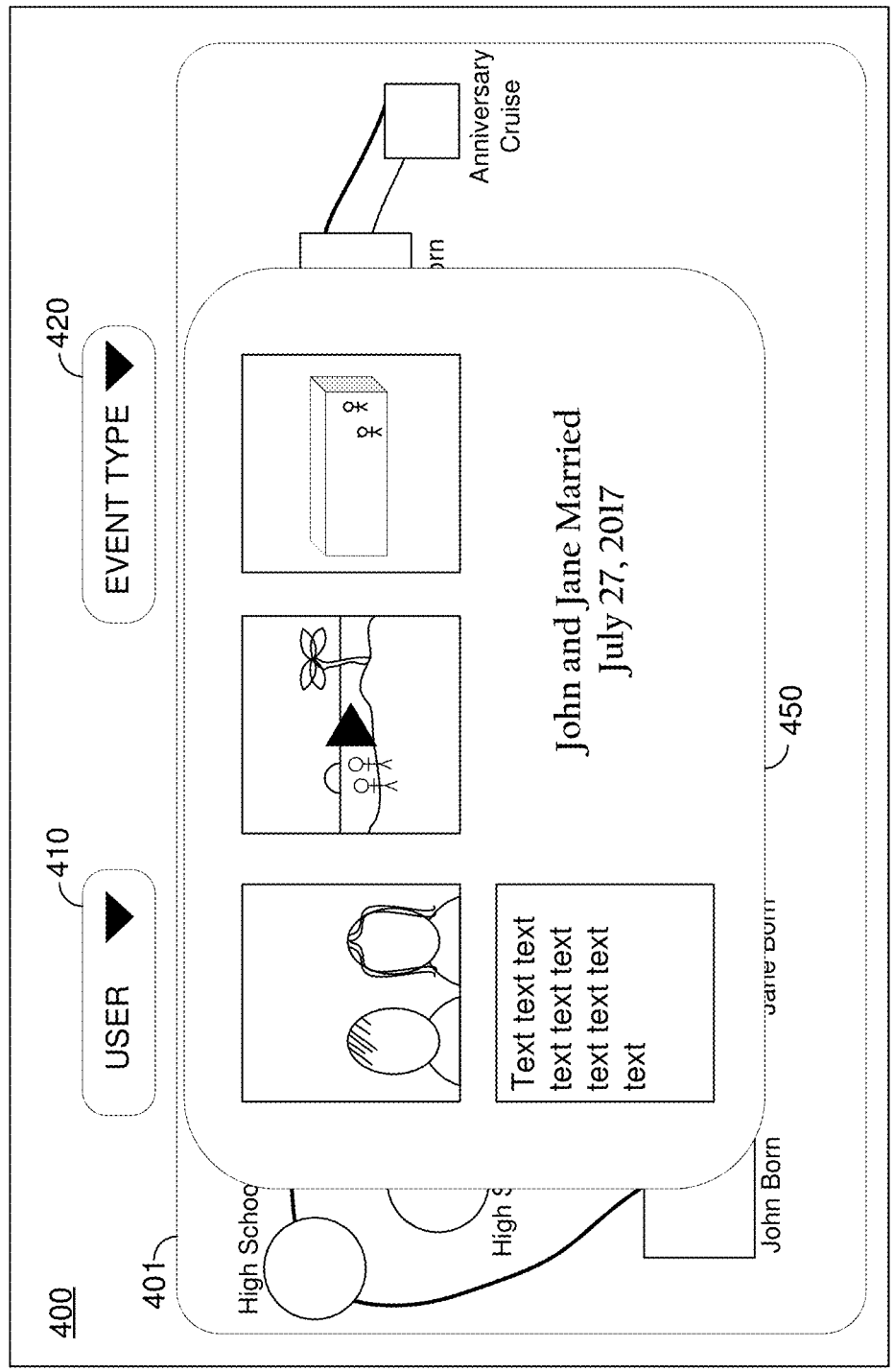

FIG. 4J illustrates the event map user interface 400 in response to detecting the user input 499I directed to the second event representation 431B. In FIG. 4J, the event map 401 is overlaid with an event window 450. The event window 450 displays content related to the event, such as text, audio, images, video, or XR content. In various implementations, a user input directed to the content plays the content, such as playing audio or video. In various implementations, a user input directed to the content enlarges the content, such as enlarging an image. In various implementations, a user input directed to the content immerses the user in an XR environment populated with XR content associated with the event.

FIGS. 4A-4J illustrate the event map 401 as part of a two-dimensional event map user interface 400. In various implementations, an event map is displayed as a two-dimensional event map in a three-dimensional XR environment. In various implementations, an event map is displayed as a three-dimensional event map in a three-dimensional XR environment.

Figure 5A:
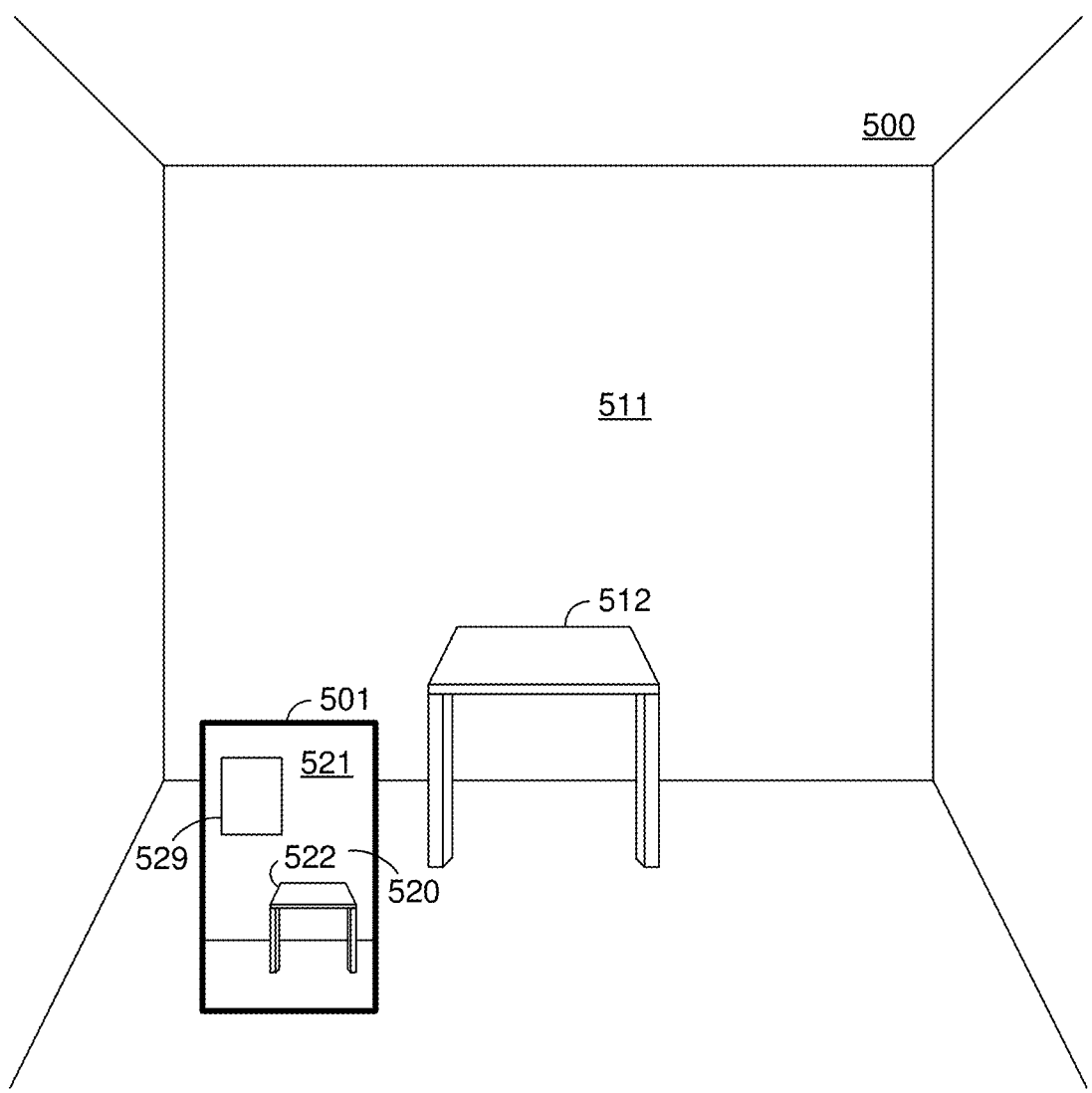
FIG. 5A illustrates a physical environment including an electronic device displaying a first XR environment based on the physical environment.

FIG. 5A illustrates a physical environment 500 including a wall 511, a table 512, and an electronic device 501 surveying the physical environment 500. The electronic device 501 displays a first XR environment 520 based on the physical environment 500 including a representation of the wall 521, a representation of the table 522, and a two-dimensional event map 529 displayed on the virtual representation of the wall 521. In various implementations, the two-dimensional event map 529 is a virtual two-dimensional object displaying event representations as described above with respect to the event map 401 of FIGS. 4A-4J.

Figure 5B:
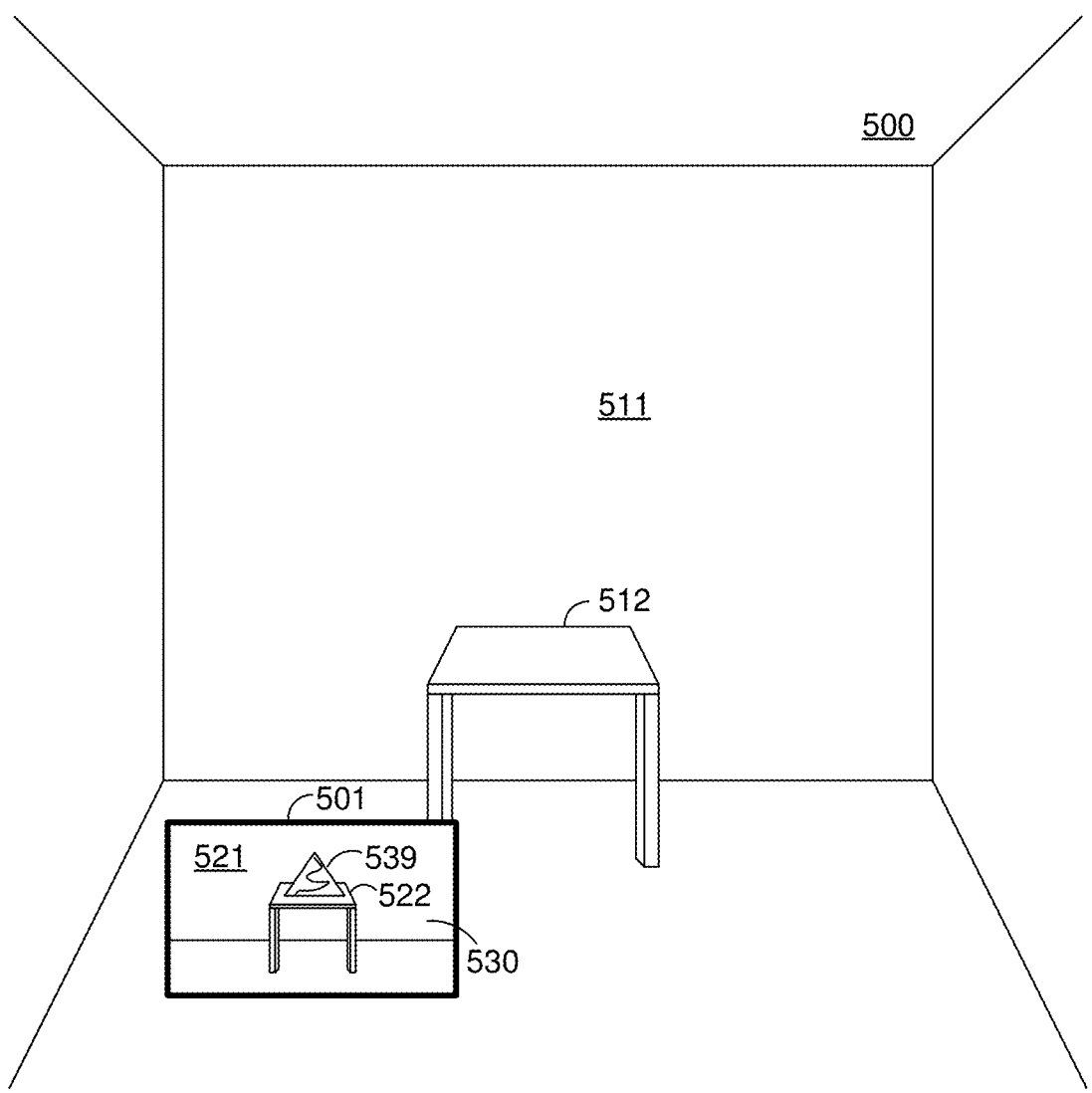
FIG. 5B illustrates the physical environment of FIG. 5A including the electronic device displaying a second XR environment based on the physical environment.

FIG. 5B illustrates the physical environment 500 of FIG. 5A in which the electronic device 501 displays a second XR environment 530 based on the physical environment 500. The second XR environment 530 includes a representation of the wall 521, a representation of the table 522, and a three-dimensional event map 539 displayed on the representation of the table 522. In various implementations, the three-dimensional event map 539 is a three-dimensional object displaying event representations as described above with respect to the event map 401 of FIGS. 4A-4J.

Figure 5C:
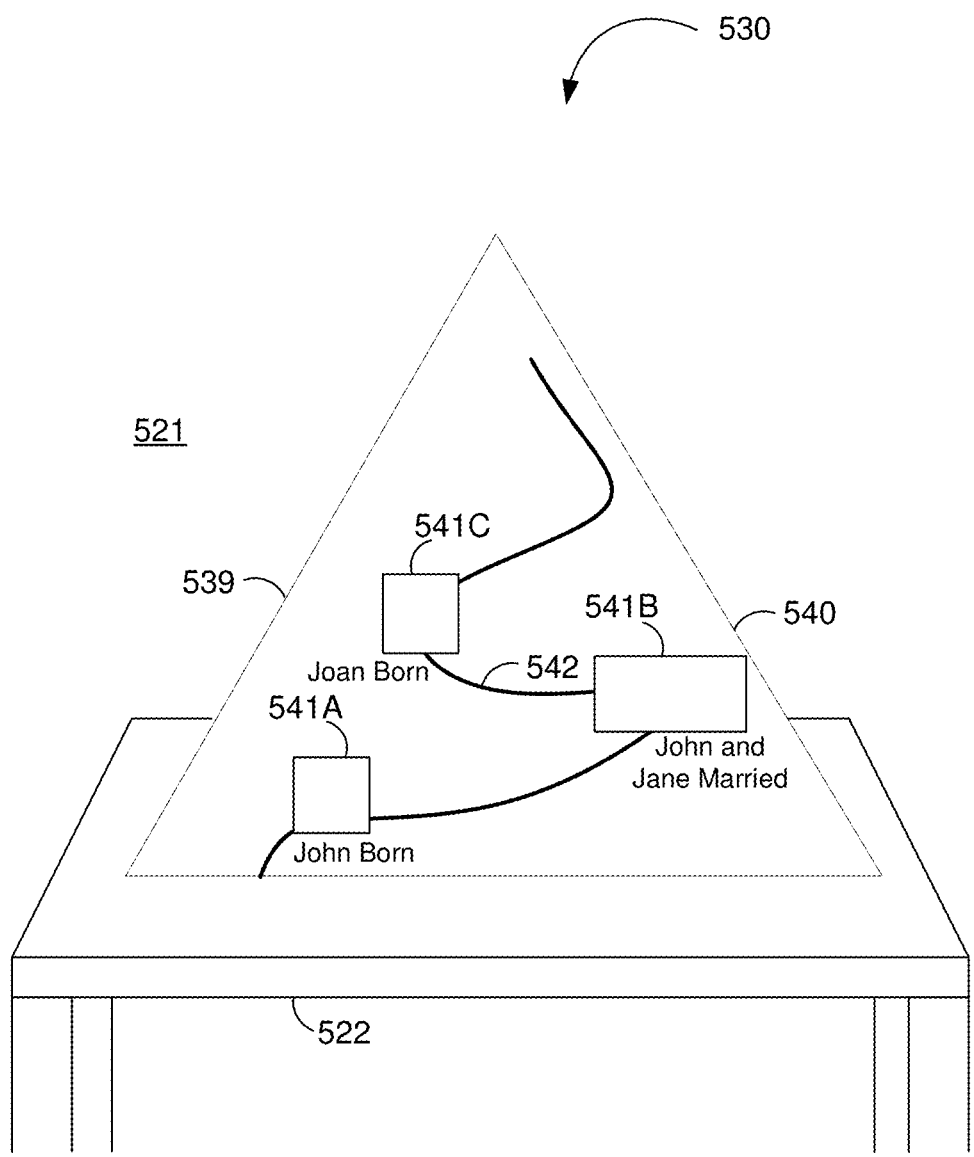
FIG. 5C illustrates the second XR environment of FIG. 5B.

FIG. 5C illustrates the second XR environment 530 displaying the three-dimensional event map 539 including event representations 541A-541C according to the same selections as FIG. 4A. The three-dimensional event map 539 includes, as opposed to a background image in a two-dimensional event map, a three-dimensional substrate 540, such as a mountain or a globe. The three-dimensional event map 539 includes event representations 541A-541C at various locations on the three-dimensional substrate 540. In various implementations, the event representations 541A-541C are two-dimensional objects covering an area of the three-dimensional substrate 540. In various implementations, the event representations 541A-541C are three-dimensional objects on the three-dimensional substrate 540. The three-dimensional event map 539 includes a path representation 542 that traverses the event representations 541A-541C.

It is to be appreciated that, according to different user selections and event type selections, the event map 539 displays different event representations. As described above, in various implementations, user selection and/or event type selection can be input by a user via vocal commands In various implementations, the second XR environment 530 includes displayed affordances for user selection and/or event type selection which may be activated, for example, by gaze and gesture.

FIG. 6 is a flowchart representation of a method 600 of displaying event representations associated with a selected event type in accordance with some implementations. In various implementations, the method 600 is performed by a device including an input device, a display, one or more processors, and non-transitory memory (e.g., the electronic device 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining event data regarding a plurality of events associated with a user, wherein each of the plurality of events is respectively associated with one or more of a plurality of event types. In various implementations, the event data includes a plurality of event data objects respectively defining the plurality of events. In various implementations, each of the event data objects includes a users field populated with data indicative of the user. In various implementations, one or more of the users fields are populated with data indicative of one or more additional users. In various implementations, each of the plurality of data objects includes an event type field populated with data indicative of the one or more event types. In various implementations, the data indicative of the one or more event types for each of the data objects indicates a single respective event type. In various implementations, the data indicative of the one or more event types for a particular data object indicates multiple event types. In various implementations, each of the plurality of data objects includes a time field populated with data indicative of a time of the event. In various implementations, the data indicative of the time of the event is a particular minute (e.g., Mar. 4, 2020, 13:20 GMT). In various implementations, the data indicative of the time of the event is a particular day (e.g., May 7, 1999). In various implementations, the time of the event is a range of times (e.g., Apr. 10-15, 2004).

In various implementations, the device generates the event data objects based on user input. For example, in various implementations, the device generates an event data object corresponding to an event based on user input indicative of an event, including a title, associated users, a time of the event, a location of the event, content associated with the event, related events, etc.

In various implementations, the device generates the event data objects based on data retrieved from a social media platform. For example, a user may post to a social media account, in a first post, that she was married to a second user on a particular date and may further post, in a second post, images from the wedding. Upon being granted access to the user account on the social media platform, the electronic device generates an event data object based on these posts, such as a title "User 1 married User 2", associated users tagged in the first post, a time of the event as indicated by the first post, a location of the event tagged by the first post, content associated with the event including the images of the second post, etc.

In various implementations, the device generates the event data objects based on data generated from a photo set, such as the photos of a social media account, an online photo storage site, or a non-transitory memory of the device.

Thus, in various implementations, obtaining the event data includes obtaining a plurality of images associated with the user. In various implementations, each of the plurality of images is further associated with a respective time and a respective location.

In various implementations, obtaining the plurality of images associated with the user includes receiving a user input from the user to access a photo storage associated with the user. In various implementations, obtaining the plurality of images associated with the user includes receiving permission and/or authentication credentials from the user to access the photo storage associated with the user. In various implementations, the photo storage is a local memory, e.g., a non-transitory computer-readable medium of the device. In various implementations, the photo storage is a remote memory, e.g., cloud storage.

In various implementations, obtaining the plurality of images associated with the user includes receiving a user input from the user to access a social media account associated with the user. In various implementations, obtaining the plurality of images associated with the user includes receiving permission and/or authentication credentials from the user to access the social media account associated with the user.

In various implementations, the device determines, from the respective times and respective locations, a plurality of clusters, wherein each of the plurality of clusters represents a subset of the plurality of images.

In various implementations, at least one of the plurality of clusters is determined based on a number of images of the plurality of images at a particular location. In various implementations, a cluster is more likely to be determined when there are a greater number of the plurality of images at a location (or within a threshold distance from a location).

In various implementations, at least one of the plurality of clusters is determined based on a time span of a number of images of the plurality of images at a particular location. In various implementations, a cluster is more likely to be determined when there is a set of the plurality of images at a location covering at least a threshold amount of time.

In various implementations, at least one of the plurality of clusters is determined based on metadata regarding the user. In various implementations, the metadata regarding the first user includes a home location. In various implementations, a cluster is more likely to be determined when there is a set of the plurality of images at a location far from the home location of the user.

In various implementations, at least one of the plurality of clusters is determined based on a tagged event associated with a subset of the plurality of images. In various implementations, a cluster is more likely to be determined when there is a set of the plurality of first images associated with a tagged event (either in the post including the image or within a threshold amount of time of such a post).

In various implementations, the device generates an event data object for each of the clusters, such as a title based on related posts or object recognition, associated users based on facial recognition, a time of the event as indicated by the respective times of the images, content associated with the event including the images, etc.

In various implementations, the one or more event types for a particular data object are input by the user, e.g., in generating the event type data object. In various implementations, the one or more event types for a particular data object are determined by the device. In various implementations, the plurality of event types is predetermined. In various implementations, the plurality of event types includes a custom, user-defined event type.

In various implementations, the event type is "Family" relating to events such as births, marriages, deaths, family vacations, moving homes, etc. In various implementations, the event type is "Profession" relating to events such as hirings, firings, promotions, transfers, etc. In various implementations, the event type is "School" relating to events such as matriculation, graduation, academic honors, etc. Thus, in various implementations, the plurality of event types includes a familial event type, a professional event type, and an academic event type.

In various implementations, the event type is "Hobby" relating to events such as matches, tournaments, championships, rankings, awards, etc. In various implementations, the event type is "Medical" relating to events such as diagnosis, doctors' and/or hospital visits, test results, etc.

The method 600 continues, in block 620, with the device detecting, via the input device, a user input selecting a particular event type. In various implementations, the user input is input by a user tapping a finger (or stylus) on a touch-sensitive display at the location of an event type selection affordance. In various implementations, the user input is input by a user clicking a mouse button while a cursor is displayed at the location of the event type selection affordance. In various implementations, the user input is input by a user gazing at the event type selection affordance and performing a hand gesture, a facial gesture, or vocal command In various implementations, the user input is input by a vocal command, e.g., "Select Event Type A".

The method 600 continues, in block 630, with the device obtaining a plurality of event representations respectively associated with a subset of the plurality of events associated with the particular event type. In various implementations, the event representations are icons and/or images based on the event. For example, in various implementations, the event representation for a birth is an image of a baby and the event representation for a marriage is an image of a bride and groom at an altar. In various implementations, the event representations are abstract shapes, such as squares or circles. In various implementations, the event representations are based on the particular event type, such as different colors for different event types.

In various implementations, whereas the subset of the plurality of events associated with the particular event type includes only events associated with the particular event type, the subset of the plurality of events associated with particular event type does not necessarily include all of the plurality of events associated with the particular event type.

The method 600 continues, in block 640, with the device displaying, on the display, the plurality of event representations and a path representation traversing the plurality of event representations. In various implementations, the path representation traverses the plurality of event representations in temporal order according to the time of the event.

In various implementations, displaying the plurality of event representations and the path representation includes displaying an event map. In various implementations, the event map is two-dimensional event map. In various implementations, the two-dimensional event map includes a background image. In various implementations, the event map is a three-dimensional event map. In various implementations, displaying the plurality of event representations and the path representation includes displaying the three-dimensional event map in an XR environment. In various implementations, the three-dimensional event map includes a three-dimensional substrate. In various implementations, the event representations are three-dimensional objects on the three-dimensional substrate.

For example, in FIG. 4E, in response to a selection of the first event type named "Family", the event map user interface 400 includes a plurality of event representations 431B-431D associated with events associated with the first event type.

In various implementations, the method 600 further includes detecting, via the input device a second user input selecting a second particular event type of the plurality of event types, obtaining a second plurality of event representations respectively associated with a second subset of the plurality of events associated with the second particular event type, and displaying, on the display, the second plurality of event representations and the path representation traversing the combination of the plurality of event representations and the second plurality of event representations.

For example, in FIG. 4F, in response to selection of the second event type named "School", the event map user interface 400 includes a plurality of event representations, 431E-431G associated with events associated with the second event type.

In various implementations, the method 600 further includes detecting, via the input device, a second user input deselecting the particular event type and ceasing to display the plurality of event representations.

FIG. 7 is a flowchart representation of a method 700 of displaying event representations associated with a related event in accordance with some implementations. In various implementations, the method 700 is performed by a device including an input device, a display, one or more processors, and non-transitory memory (e.g., the electronic device 120 of FIG. 3). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with the device obtaining event data regarding a plurality of events associated with a user. In various implementations, the event data includes a plurality of event data objects respectively defining the plurality of events, including a particular event data object defining the particular one of the plurality of events. In various implementations, the particular event data object includes a related event field populated with data indicative of one or more of the plurality of events associated with the particular one of the plurality of events. In various implementations, each of the plurality of event data objects includes an identifier field including an identifier of the event data object. In various implementations, the data indicative of the one or more of the plurality of events associated with the particular one of the plurality of events includes the identifiers of the data objects defining those events, e.g., one or more identifiers of the data objects defining the one or more of the plurality of events associated with the particular one of the plurality of events.

In various implementations, the data indicative of the one or more of the plurality of events associated with the particular one of the plurality of events further includes data indicative of one or more relationship types of the particular one of the plurality of events and the one or more of the plurality of events associated with the particular one of the plurality of events. For example, in various implementations, the relationship type indicates that an associated event is "caused by" the particular one of the plurality of events. In various implementations, the relationship type indicates that an associated event is "the cause of" the particular one of the plurality of events.

In various implementations, each of the plurality of data objects includes a time field populated with data indicative of a time of the event. In various implementations, the data indicative of the time of the event is a particular minute (e.g., Mar. 4, 2020, 13:20 GMT). In various implementations, the data indicative of the time of the event is a particular day (e.g., May 7, 1999). In various implementations, the time of the event is a range of times (e.g., Apr. 10-15, 2004).

In various implementations, the device obtains and/or generates the event data objects as described above with respect to block 610 of FIG. 6.

The method 700 continues, in block 720, with the device obtaining a plurality of event representations respectively associated with a subset of the plurality of events. In various implementations, the event representations are icons and/or images based on the event. For example, in various implementations, the event representation for a birth is an image of a baby and the event representation for a marriage is an image of a bride and groom at an altar. In various implementations, the event representations are abstract shapes, such as squares or circles.

The method 700 continues, in block 730, with the device displaying, on the display, the plurality of event representations and a path representation traversing the plurality of event representations. In various implementations, the path representation traverses the plurality of event representations in temporal order according to the time of the event.

In various implementations, displaying the plurality of event representations and the path representation includes displaying an event map. In various implementations, the event map is two-dimensional event map. In various implementations, the two-dimensional event map includes a background image. In various implementations, the event map is a three-dimensional event map. In various implementations, displaying the plurality of event representations and the path representation includes displaying the three-dimensional event map in an XR environment. In various implementations, the three-dimensional event map includes a three-dimensional substrate. In various implementations, the event representations are three-dimensional objects on the three-dimensional substrate.

The method 700 continues, in block 740, with the device detecting, via the input device, a user input selecting a particular one of the plurality of event representations. In various implementations, the user input is input by a user tapping a finger (or stylus) on a touch-sensitive display at the location of the particular one of the plurality of event representations. In various implementations, the user input is input by hovering a finger (or stylus) over the touch-sensitive display at the location of the particular one of the plurality of event representations. In various implementations, the user input is input by a user clicking a mouse button while a cursor is displayed at the location of the particular one of the plurality of event representations. In various implementations, the user input is input by a user hovering a cursor over the particular one of the plurality of event representations for at least a threshold amount of time. In various implementations, the user input is input by a user gazing at the particular one of the plurality of event representations and performing a hand gesture, a facial gesture, or vocal command In various implementations, the user input is input by a user gazing at the particular one of the plurality of event representations for at least a threshold amount of time. In various implementations, the user input is input by a vocal command, e.g., "Select Event Representation A".

Thus, in various implementations, the user input selecting the particular one of the plurality of event representations includes hovering over a location of the particular one of the plurality of event representations. In various implementations, the user input selecting the particular one of the plurality of event representations includes gazing at the particular one of the plurality of event representations for at least a threshold amount of time.

The method 700 continues, in block 750, with the device obtaining one or more supplemental event representations respectively associated with one or more of the plurality of events associated with the particular one of the plurality of events. In various implementations, the device identifies the one or more of the plurality of events associated with the particular one of the plurality of events based on identifiers in the related events field.

The method 700 continues, in block 760, with the device displaying, on the display, the one or more supplemental event representations. In various implementations, displaying the one or more supplemental event representations includes continuing to display the plurality of event representations. In various implementations, displaying the one or more supplemental event representations includes displaying the path representation traversing the combination of the plurality of event representations and one or more supplemental event representations.

For example, in FIG. 4I, in response to a selection of the second event representation 431B, the event map user interface 400 includes the eleventh event representation 431K and the twelfth event representation 431L.

FIG. 8 is a flowchart representation of a method 800 of displaying event representations associated with multiple users in accordance with some implementations. In various implementations, the method 800 is performed by a device including an input device, a display, one or more processors, and non-transitory memory (e.g., the electronic device 120 of FIG. 3). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device obtaining event data regarding a plurality of events associated with a first user. In various implementations, the event data includes a plurality of event data objects respectively defining the plurality of events. In various implementations, each of the event data objects includes a users field populated with data indicative of one or more users associated with the event. As each of the plurality of events is associated with the first user, each of the event data objects includes a users field populated with data indicative of one or more users including the first user.

Further, one or more of the plurality of events are associated with a second user and are defined by a respective one or more of the plurality of data objects, each of the respective one or more of the plurality of data objects including a users field populated with data indicative of one or more users including the second user (and the first user).

In various implementations, each of the plurality of data objects includes a time field populated with data indicative of a time of the event. In various implementations, the data indicative of the time of the event is a particular minute (e.g., Mar. 4, 2020, 13:20 GMT). In various implementations, the data indicative of the time of the event is a particular day (e.g., May 7, 1999). In various implementations, the time of the event is a range of times (e.g., Apr. 10-15, 2004).

In various implementations, the device obtains and/or generates the event data objects as described above with respect to block 610 of FIG. 6.

The method 800 continues, in block 820, with the device obtaining a plurality of event representations respectively associated with a subset of the plurality of events. In various implementations, the event representations are icons and/or images based on the event. For example, in various implementations, the event representation for a birth is an image of a baby and the event representation for a marriage is an image of a bride and groom at an altar. In various implementations, the event representations are abstract shapes, such as squares or circles. In various implementations, the event representations are based on the user, such as different colors for different users.

The method 800 continues, in block 830, with the device displaying, on the display, the plurality of event representations and a path representation traversing the plurality of event representations. In various implementations, the path representation traverses the plurality of event representations in temporal order according to the time of the event.

In various implementations, displaying the plurality of event representations and the path representation includes displaying an event map. In various implementations, the event map is a two-dimensional event map. In various implementations, the two-dimensional event map includes a background image. In various implementations, the event map is a three-dimensional event map. In various implementations, displaying the plurality of event representations and the path representation includes displaying the three-dimensional event map in an XR environment. In various implementations, the three-dimensional event map includes a three-dimensional substrate. In various implementations, the event representations are three-dimensional objects on the three-dimensional substrate.

The method 800 continues, in block 840, with the device detecting, via the input device, a user input selecting a second user. In various implementations, the user input is input by a user tapping a finger (or stylus) on a touch-sensitive display at the location of a user selection affordance. In various implementations, the user input is input by a user clicking a mouse button while a cursor is displayed at the location of the user selection affordance. In various implementations, the user input is input by a user gazing at the user selection affordance and performing a hand gesture, a facial gesture, or vocal command In various implementations, the user input is input by a vocal command, e.g., "Select User B".

The method 800 continues, in block 850, with the device obtaining one or more supplemental event representations respectively associated with one or more of the plurality of events associated with the second user. In various implementations, the device identifies the one or more of the plurality of events associated with the second user based on the users fields.

In various implementations, whereas the one or more of the plurality of events associated with the second user includes only events associated with the first user and the second user, the one or more of the plurality of events associated with the second user does not necessarily include all of the plurality of events associated with the first user and the second user.

The method 800 continues, in block 860, with the device displaying, on the display, the one or more supplemental event representations. In various implementations, displaying the one or more supplemental event representations includes continuing to display the plurality of event representations. In various implementations, displaying the one or more supplemental event representations includes displaying the path representation traversing the combination of the plurality of event representations and one or more supplemental event representations.

For example, in FIG. 4H, in response to a selection of the first user selection affordance 411A, the event map user interface 400 includes the ninth event representation 431I and the tenth event representation 431J.

In various implementations, the method 800 further includes, in response to detecting the user input, obtaining event data regarding a plurality of events associated with the second user, obtaining a second plurality of event representations respectively associated with a subset of the plurality of events associated with the second user and not associated with the first user, and displaying the second plurality of event representations. Thus, in various implementations, the event map includes event representations associated with the first user and not the second user, event representations associated with the second user and not the first user, and event representations associated with both the first user and the second user.

In various implementations, the method 800 further includes displaying a second path representation traversing the combination of the second plurality of event representations and the one or more supplemental event representations.

FIG. 9 is a flowchart representation of a method 900 of displaying event representations based on a user input in accordance with some implementations. In various implementations, the method 900 is performed by a device including an input device, a display, one or more processors, and non-transitory memory (e.g., the electronic device 120 of FIG. 3). In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins, in block 910, with the device obtaining event data regarding a plurality of events associated with a first user. In various implementations, the event data includes a plurality of event data objects respectively defining the plurality of events.

In various implementations, at least one of the event data objects includes an identifier field populated with an identifier of the event data object. In various implementations, the identifier is a unique number or alphanumeric string.

In various implementations, at least one of the event data objects includes a title field populated with a title of the event as an alphanumeric string.

In various implementations, at least one of the event data objects includes a users field populated with data indicative of one or more users. As each of the plurality of events are associated with the first user, each of the event data objects includes a users field populated with data indicative of the first user. In various implementations, one or more of the event data objects includes a users field populated with data indicative of the first user and one or more additional users.

In various implementations, at least one of the event data objects includes an event type field populated with data indicative of the one or more event types. In various implementations, the data indicative of the one or more event types for each of the data objects indicates a single respective event type. In various implementations, the data indicative of the one or more event types for a particular data object indicates multiple event types.

In various implementations, at least one of the plurality of event data objects includes a time field populated with data indicative of a time of the event. In various implementations, the data indicative of the time of the event is a particular minute (e.g., Mar. 4, 2020, 13:20 GMT). In various implementations, the data indicative of the time of the event is a particular day (e.g., May 7, 1999). In various implementations, the time of the event is a range of times (e.g., Apr. 10-15, 2004).

In various implementations, at least one of the plurality of event data objects include a location field populated with data indicative of a location of the event. In various implementations, the data indicative of the location of the event includes GPS coordinates. In various implementations, the data indicative of the location of the event indicates an address (or venue at an address), a city, a state, or a country.

In various implementations, a particular one of the plurality of event data objects includes a related event field populated with data indicative of one or more of the plurality of events associated with the particular one of the plurality of events. In various implementations, the data indicative of the one or more of the plurality of events associated with the particular one of the plurality of events includes identifiers of the corresponding event data objects.

In various implementations, the data indicative of the one or more of the plurality of events associated with the particular one of the plurality of events further includes data indicative of one or more relationship types of the particular one of the plurality of events and the one or more of the plurality of events associated with the particular one of the plurality of events. For example, in various implementations, the relationship type indicates that an associated event is "caused by" the particular one of the plurality of events. In various implementations, the relationship type indicates that an associated event is "the cause of" the particular one of the plurality of events.

In various implementations, at least one of the event data objects includes data indicative of a significance of the event. In various implementations, the data indicative of the significance of the event is a numerical significance score. For example, in various implementations, the significance scores range from 1 to 100.

In various implementations, at least one of the event data objects includes content associated with the event. In various implementations, the content includes text, images, audio, video, or XR content.

In various implementations, the device generates the event data objects based on user input. For example, in various implementations, the device generates an event data object corresponding to an event based on user input indicative of an event, including a title, associated users, a time of the event, a location of the event, content associated with the event, related events, etc.

In various implementations, the device generates the event data objects based on data retrieved from a social media platform. For example, a user may post to a social media account, in a first post, that she was married to a second user on a particular date and may further post, in a second post, images from the wedding. Upon being granted access to the user account on the social media platform, the electronic device generates an event data object based on these posts, such as a title "User 1 married User 2", associated users tagged in the first post, a time of the event as indicated by the first post, a location of the event tagged by the second post, content associated with the event including the images of the second post, etc.

In various implementations, the device generates the event data objects based on data generated from a photo set, such as the photos of a social media account, an online photo storage site, or a non-transitory memory of the device.

Thus, in various implementations, obtaining the event data includes obtaining a plurality of images associated with the user. In various implementations, each of the plurality of images is further associated with a respective time and a respective location.

In various implementations, obtaining the plurality of images associated with the user includes receiving a user input from the user to access a photo storage associated with the user. In various implementations, obtaining the plurality of images associated with the user includes receiving permission and/or authentication credentials from the user to access the photo storage associated with the user. In various implementations, the photo storage is a local memory, e.g., a non-transitory computer-readable medium of the device. In various implementations, the photo storage is a remote memory, e.g., cloud storage.

In various implementations, obtaining the plurality of images associated with the user includes receiving a user input from the user to access a social media account associated with the user. In various implementations, obtaining the plurality of images associated with the user includes receiving permission and/or authentication credentials from the user to access the social media account associated with the user.

In various implementations, the device determines, from the respective times and respective locations, a plurality of clusters, wherein each of the plurality of clusters represents a subset of the plurality of images.

In various implementations, at least one of the plurality of clusters is determined based on a number of images of the plurality of images at a particular location. In various implementations, a cluster is more likely to be determined when there are a greater number of the plurality of images at a location (or within a threshold distance from a location).

In various implementations, at least one of the plurality of clusters is determined based on a time span of a number of images of the plurality of images at a particular location. In various implementations, a cluster is more likely to be determined when there is a set of the plurality of images at a location covering at least a threshold amount of time.

In various implementations, at least one of the plurality of clusters is determined based on metadata regarding the user. In various implementations, the metadata regarding the first user includes a home location. In various implementations, a cluster is more likely to be determined when there is a set of the plurality of images at a location far from the home location of the user.

In various implementations, at least one of the plurality of clusters is determined based on a tagged event associated with a subset of the plurality of images. In various implementations, a cluster is more likely to be determined when there is a set of the plurality of first images associated with a tagged event (either in the post including the image or within a threshold amount of time of such a post).

In various implementations, the device generates an event data object for each of the clusters, such as a title based on related posts or object recognition, associated users based on facial recognition, a time of the event as indicated by the respective times of the images, content associated with the event including the images, etc.

The method 900 continues, in block 920, with the device obtaining a first plurality of event representations respectively associated with a first subset of the plurality of events. In various implementations, the event representations are icons and/or images based on the event. For example, in various implementations, the event representation for a birth is an image of a baby and the event representation for a marriage is an image of a bride and groom at an altar. In various implementations, the event representations are abstract shapes, such as squares or circles.

The method 900 continues, in block 930, with the device displaying, on the display, the first plurality of event representations and a path representation traversing the first plurality of event representations. In various implementations, the path representation traverses the first plurality of event representations in temporal order according to the time of the event.

In various implementations, displaying the first plurality of event representations and the path representation includes displaying an event map. In various implementations, displaying the first plurality of event representations includes displaying the first plurality of event representations at respective locations on the event map based on locations of the corresponding events. In various implementations, displaying the event map includes displaying a two-dimensional event map. In various implementations, the two-dimensional event map includes a background image.

In various implementations, displaying the event map includes displaying a three-dimensional event map in an XR environment. In various implementations, the three-dimensional event map includes a three-dimensional substrate. In various implementations, the event representations are three-dimensional objects on the three-dimensional substrate.

The method 900 continues, in block 940, with the device detecting, via the input device, a user input. In various implementations, the user input is input by a user tapping a finger (or stylus) on a touch-sensitive display at the location of a user interface element. In various implementations, the user input is input by hovering a finger (or stylus) over the touch-sensitive display at the location of the user interface element. In various implementations, the user input is input by a user clicking a mouse button while a cursor is displayed at the location of the user interface element. In various implementations, the user input is input by a user hovering a cursor over the user interface element for at least a threshold amount of time. In various implementations, the user input is input by a user gazing at the user interface element and performing a hand gesture, a facial gesture, or vocal command In various implementations, the user input is input by a user gazing at the user interface element for at least a threshold amount of time. In various implementations, the user input is input by a vocal command.

The method 900 continues, in block 950, with the device obtaining a second plurality of event representations respectively associated with a second subset of the plurality of events. The method 900 continues, in block 960, with the device displaying, on the display, the second plurality of event representations. In various implementations, the second subset of the plurality of events is different than the first subset of the plurality of events. In various implementations, the second subset of the plurality of events includes the first subset of the plurality of events. In various implementations, displaying the second plurality of event representations includes continuing to display the first plurality of event representations.

In various implementations, the user input is a user input selecting an event type and the second subset of the plurality of events includes one or more of the plurality of events associated with the event type. For example, in FIG. 4F, in response to selection of the second event type named "School", the event map user interface 400 includes a plurality of event representations, 431E-431G associated with events associated with the second event type.

In various implementations, the user input is a user input selecting a particular one of the plurality of event representations associated with a particular one of the plurality of events and the second subset of the plurality of event representations includes one or more of the plurality of events associated with the particular one of the plurality of events. For example, in FIG. 4I, in response to a selection of the second event representation 431B, the event map user interface 400 includes the eleventh event representation 431K and the twelfth event representation 431L.

In various implementations, the user input is a user input selecting a second user and the second subset of the plurality of events includes one or more of the plurality of events associated with the second user. For example, in FIG. 4H, in response to a selection of the first user selection affordance 411A, the event map user interface 400 includes the ninth event representation 431I and the tenth event representation 431J.

In various implementations, the user input is a user input selecting a temporal range or changing a temporal range. Thus, in various implementations, the first subset of events includes events having an associated time within a first temporal range and the second subset of events includes events having an associated time within a second temporal range.

In various implementations, the plurality of first events is respectively associated with a plurality of significances. In various implementations, obtaining the first plurality of event representations respectively associated with the first subset of the plurality of events (in block 920) includes selecting the first subset of the plurality of events based on the plurality of significances.

For example, in various implementations, in order to avoid overcrowding of the event map, event representations are displayed only for events having a significance greater than a significance threshold. In various implementations, the significance threshold is based on a number of events above the significance threshold such that a fixed number (or small range of numbers) of event representations are displayed. In various implementations, the significance threshold is determined based on a user input, e.g., adjusting a slider or otherwise inputting a value for the significance threshold.

In various implementations, obtaining the second plurality of event representations respectively associated with the second subset of the plurality of events (in block 850) includes selecting the second subset of the plurality of events based on the plurality of significances.

For example, in various implementations, event representations are displayed only for events having a weighted significance greater than the significance threshold, wherein the weighted significance is based on the significance weighted based on the user input. In various implementations, the significance is below the significance threshold, but the weighted significance is above the significance threshold. Thus, in response to the user input, event representations are displayed for events for which event representations were not displayed prior to the user input.

In various implementations, in response to selecting an event type, events associated with the event type are weighted to increase their significance. In various implementations, events with an unselected event type are weighted to decrease their significance. In various implementations, events with an unselected event type are weighted to zero their significance.

In various implementations, in response to selecting a particular event representation associated with a particular event, events related to the particular event are weighted to increase their significance.

In various implementations, in response to selecting a second user, events associated with the second user are weighted to increase their significance. For example, in various implementations, an event may have a single significance and be associated with a first user and a second user. When the first user or the second user (but not both) is selected, the significance of the event is the single significance. When the first user and the second user is selected, the significance of the event is the single significance weighted to increase the significance, e.g., increased 50% or doubled.

As another example, in various implementations, an event may have a first significance to a first user and a second significance to a second user. When the first user is selected and the second user is not selected, the significance of the event is the first significance. When the second user is selected and the first user is not selected, the significance of the event is the second significance. When the first user and the second user are selected, the significance of the event is at least the first significance added to the second significance. In various implementations, the significance of the event is the sum of the first significance and the second significance further weighted to increase the significance.

In various implementations, the method 900 includes detecting a user input selecting a particular one of the plurality of event representations associated with a particular one of the plurality of events and, in response, displaying content associated with the particular one of the plurality of events.

For example, in FIG. 4J, In FIG. 4J, in response to selection of the second event representation 431B, the event map 401 is overlaid with an event window 450. The event window 450 displays content related to the event, such as text, audio, images, video, or XR content. In various implementations, a user input directed to the content plays the content, such as playing audio or video. In various implementations, a user input directed to the content enlarges the content, such as enlarging an image. In various implementations, a user input directed to the content immerses the user in an XR environment populated with XR content associated with the event.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a display, an input device, a processor and non-transitory memory:
obtaining event data regarding a plurality of events associated with a first user;
obtaining a first plurality of event representations respectively associated with a first subset of the plurality of events, wherein the first subset includes at least one event associated with a second user;
displaying, on the display, the first plurality of event representations and a path representation traversing the first plurality of event representations;
detecting, via the input device, a user input selecting the second user; and
in response to detecting the user input:
obtaining a second plurality of event representations respectively associated with a second subset of the plurality of events, wherein the second subset includes at least one event associated the second user excluded from the first subset; and
displaying, on the display, the second plurality of event representations.

2. The method of claim 1, wherein displaying the first plurality of event representations and the path representation includes displaying an event map.

3. The method of claim 2, wherein displaying the first plurality of event representations includes displaying the first plurality of event representations at respective locations on the event map based on locations of the corresponding events.

4. The method of claim 2, wherein displaying the event map includes displaying a two-dimensional event map.

5. The method of claim 4, wherein the two-dimensional event map includes a background image.

6. The method of claim 2, wherein displaying the event map includes displaying a three-dimensional event map in an extended reality (XR) environment.

7. The method of claim 1, wherein the plurality of events is respectively associated with a plurality of significances, wherein obtaining the first plurality of event representations respectively associated with the first subset of the plurality of events includes selecting the first subset of the plurality of events based on the plurality of significances, and wherein obtaining the second plurality of event representations respectively Amendment 2 associated with the second subset of the plurality of events includes updating the plurality of significances based on the user input and selecting the second subset of the plurality of events based on the updated plurality of significances.

8. The method of claim 1, further comprising:
detecting a user input selecting a particular one of the plurality of event representations associated with a particular one of the plurality of events; and
in response to detecting the user input selecting the particular one of the plurality of event representations, displaying content associated with the particular one of the plurality of events.

9. A device comprising:
an input device;
a display;
a non-transitory memory; and
one or more processors to:

obtain event data regarding a plurality of events associated with a first user;

obtain a first plurality of event representations respectively associated with a first subset of the plurality of events, wherein the first subset includes at least one event associated with a second user;

display, on the display, the first plurality of event representations and a path representation traversing the first plurality of event representations;

detect, via the input device, a user input selecting the second user; and in response to detecting the user input:

obtain a second plurality of event representations respectively associated with a second subset of the plurality of events, wherein the second subset includes at least one event associated the second user excluded from the first subset; and display, on the display, the second plurality of event representations.

10. The device of claim 9, wherein the one or more processors are to display the first plurality of event representations and the path representation by displaying a two-dimensional event map.

11. The device of claim 9, wherein the one or more processors are to display the first plurality of event representations and the path representation by displaying a three-dimensional event map in an extended reality (XR) environment.

12. The device of claim 9, wherein the plurality of events is respectively associated with a plurality of significances, wherein the one or more processors are to obtain the first plurality of event representations respectively associated with the first subset of the plurality of events by selecting the first subset of the plurality of events based on the plurality of significances, and wherein the one or more processors are to obtain the second plurality of event representations respectively associated with the second subset of the plurality of events by updating the plurality of significances based on the user input and selecting the second subset of the plurality of events based on the updated plurality of significances.

13. The device of claim 9, wherein the one or more processors are further to:

detect a user input selecting a particular one of the plurality of event representations associated with a particular one of the plurality of events; and in response to detecting the user input selecting the particular one of the plurality of event representations, display content associated with the particular one of the plurality of events.

14. A non-transitory memory storing one or more programs, which, when executed by one or more processors of a device including an input device and a display, cause the device to:

obtain event data regarding a plurality of events associated with a first user;

obtain a first plurality of event representations respectively associated with a first subset of the plurality of events, wherein the first subset includes at least one event associated with a second user;

display, on the display, the first plurality of event representations and a path representation traversing the first plurality of event representations;

detect, via the input device, a user input selecting the second user; and in response to detecting the user input:

obtain a second plurality of event representations respectively associated with a second subset of the plurality of events, wherein the second subset includes at least one event associated the second user excluded from the first subset; and display, on the display, the second plurality of event representations.

15. The method of claim 1, wherein the first subset includes at least one event not associated with the second user.

16. The method of claim 15, wherein the second subset includes the at least one event not associated with the second user.

17. The method of claim 15, further comprising, in response to detecting the user input:

obtaining a third plurality of event representations respectively associated with a plurality of events associated with the second user and not associated with the first user; and displaying, on the display, the third plurality of events.

18. The device of claim 9, wherein the first subset includes at least one event not associated with the second user.

19. The device of claim 18, wherein the second subset includes the at least one event not associated with the second user.

20. The device of claim 18, wherein the one or more processors are further to, in response to detecting the user input:

obtain a third plurality of event representations respectively associated with a plurality of events associated with the second user and not associated with the first user; and display, on the display, the third plurality of events.

* * * * *